US010746413B2

(12) United States Patent
Berchtold

(10) Patent No.: US 10,746,413 B2
(45) Date of Patent: Aug. 18, 2020

(54) BUILDING ENVELOPE AND METHOD FOR ADJUSTING THE TEMPERATURE IN A BUILDING

(71) Applicant: IIS INSTITUTE FOR INDEPENDENT STUDIES GMBH, Zurich (CH)

(72) Inventor: Julian Berchtold, Zurich (CH)

(73) Assignee: IIS INSTITUTE FOR INDEPENDENT STUDIES GMBH, Zurich (CH)

( * ) Notice: Subject to any disclaimer, the term of this patent is extended or adjusted under 35 U.S.C. 154(b) by 477 days.

(21) Appl. No.: 14/441,789

(22) PCT Filed: Nov. 7, 2013

(86) PCT No.: PCT/EP2013/073238
§ 371 (c)(1),
(2) Date: May 8, 2015

(87) PCT Pub. No.: WO2014/072385
PCT Pub. Date: May 15, 2014

(65) Prior Publication Data
US 2015/0276233 A1    Oct. 1, 2015

(30) Foreign Application Priority Data
Nov. 8, 2012 (EP) .................... 12191806

(51) Int. Cl.
*F24D 3/14* (2006.01)
*F28D 15/02* (2006.01)
(Continued)

(52) U.S. Cl.
CPC ............ *F24D 3/148* (2013.01); *E04B 1/74* (2013.01); *F24S 10/90* (2018.05); *F24S 20/66* (2018.05);
(Continued)

(58) Field of Classification Search
CPC ...... F24F 5/0089; F24F 5/0003; F24F 5/0075; F24F 11/0012; F24F 2011/0013;
(Continued)

(56) References Cited
U.S. PATENT DOCUMENTS 3,968,831 A    7/1976  Xenophou
4,273,100 A *  6/1981  Cogliano ............... F24J 2/0444
                                                    126/619
(Continued)

FOREIGN PATENT DOCUMENTS

CH    703 760 A2    3/2012
DE   24 31 940 A1   1/1975
(Continued)

OTHER PUBLICATIONS

Notification of Transmittal if Translation of the International Preliminary Report on Patentability (Forms PCT/IB/338 and PCT/IB/373) and the Written Opinion of the International Searching Authority (Form PCT/ISA/237) dated May 21, 2015, by the International Bureau of WIPO in corresponding International Application Na PCT/EP2013/0732238. (9 pages).
(Continued)

*Primary Examiner* — Travis C Ruby
(74) *Attorney, Agent, or Firm* — Buchanan Ingersoll & Rooney PC

(57) ABSTRACT

Disclosed is a building envelope for a building wall, floor, or roof of a building, the building envelope comprising at least two shells spaced apart from one another which enclose a single intermediate space sealed against the interior and the exterior of the building and being filled with structural weight-bearing and building-technology components, and at least in sections with a porous, open-celled 3D-pattern material. A plurality of heat pipes, formed by associated first and second pipes in the exterior and interior facing shell, (Continued)

respectively, are connected to a heat collector element on the exterior and interior facing shell, respectively protrude from the building envelope, and are configured to increase, hold or decrease heat transition through the building envelope or to affect heat transport into or out of the building envelope.

31 Claims, 16 Drawing Sheets

(51) Int. Cl.
*E04B 1/74* (2006.01)
*F24S 10/90* (2018.01)
*F24S 20/66* (2018.01)
*F24S 80/00* (2018.01)

(52) U.S. Cl.
CPC .......... *F28D 15/02* (2013.01); *F24S 2080/03* (2018.05); *Y02B 10/20* (2013.01); *Y02B 30/24* (2013.01); *Y02E 10/44* (2013.01)

(58) Field of Classification Search
CPC .......... F24F 2221/17; E04B 1/74; E04B 2/86; E04B 2/30; E04B 1/7612; E04F 13/074; E04F 2290/023; E04F 13/0869; F24D 3/14; F24D 3/147; F24D 19/1009; F24D 2220/006; F24D 2220/10; F24D 5/10; F24J 2/0444; F24J 2/32; F28D 15/02
See application file for complete search history.

(56) References Cited

U.S. PATENT DOCUMENTS

| | | | |
|---|---|---|---|
| 4,295,415 A | 10/1981 | Schneider, Jr. | |
| 4,382,437 A | 5/1983 | Woods, Jr. et al. | |
| 2003/0046894 A1 | 3/2003 | Scholz | |
| 2013/0008109 A1 | 1/2013 | Brown et al. | |
| 2013/0040551 A1 | 2/2013 | Serras | |

FOREIGN PATENT DOCUMENTS

| | | |
|---|---|---|
| DE | 36 25 454 A1 | 1/1987 |
| DE | 100 06 878 A1 | 9/2001 |
| DE | 101 32 182 A1 | 1/2003 |
| DE | 10 2008 009 553 A1 | 11/2008 |
| EP | 1 223 254 A1 | 7/2002 |
| EP | 0 885 369 B1 | 8/2003 |
| EP | 1 619 444 A1 | 1/2006 |
| FR | 2 954 970 | 7/2011 |
| GB | 1 477 191 A | 6/1977 |
| JP | 57-210243 A | 12/1982 |
| WO | WO 01/61118 A1 | 8/2001 |
| WO | WO 2009/060484 A1 | 5/2009 |
| WO | WO 2010/122353 A1 | 10/2010 |
| WO | WO 2011/107731 A1 | 9/2011 |
| WO | WO 2011/146025 A1 | 11/2011 |

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) dated May 21, 2015, by the International Bureau of WIPO in the International Application No. PCT/EP2013/073239. (7 pages).

Notification of Transmittal of Translation of the International Preliminary Report on Patentability (Forms PCT/IB/338 and PCT/IB/373) and the Written Opinion of the International Searching Authority (Form PCT/ISA/237) dated May 21, 2015, by the International Bureau of WIPO in the International Application No. PCT/EP2013/073237. (9 pages).

International Search Report (PCT/ISA/210) dated Feb. 7, 2014, by the European Patent Office as the International Searching Authority for International Application No. PCT/EP2013/073237.

Written Opinion (PCT/ISA/237) dated Feb. 7, 2014, by the European Patent Office as the International Searching Authority for International Application No. PCT/EP2013/073237.

International Search Report (PCT/ISA/210) dated Feb. 7, 2014, by the European Patent Office as the International Searching Authority for International Application No. PCT/EP2013/073239.

Written Opinion (PCT/ISA/237) dated Feb. 7, 2014, by the European Patent Office as the International Searching Authority for International Application No. PCT/EP2013/073239.

International Search Report (PCT/ISA/210) dated Feb. 7, 2014, by the European Patent Office as the International Searching Authority for International Application No. PCT/EP2013/073238.

Written Opinion (PCT/ISA/237) dated Feb. 7, 2014, by the European Patent Office as the International Searching Authority for International Application No. PCT/EP2013/073238.

Proceedings of the 10th International Vacuum Insulation Symposium, Ottawa, CA, 2011. (208 pages).

B. Jelle et al., "The path to the high performance thermal building insulation materials and solutions of tomorrow", Journal of Building Physics, Jul. 20, 2010, pp. 99-123, vol. 34, vol. 2.

V. Gasser et al., "Gebaudetechnik: Faktor 10 [Construction Engineering: Factor 10]", Bau + Architektur [Construction + Architecture], 4/05, pp. 34-35.

* cited by examiner

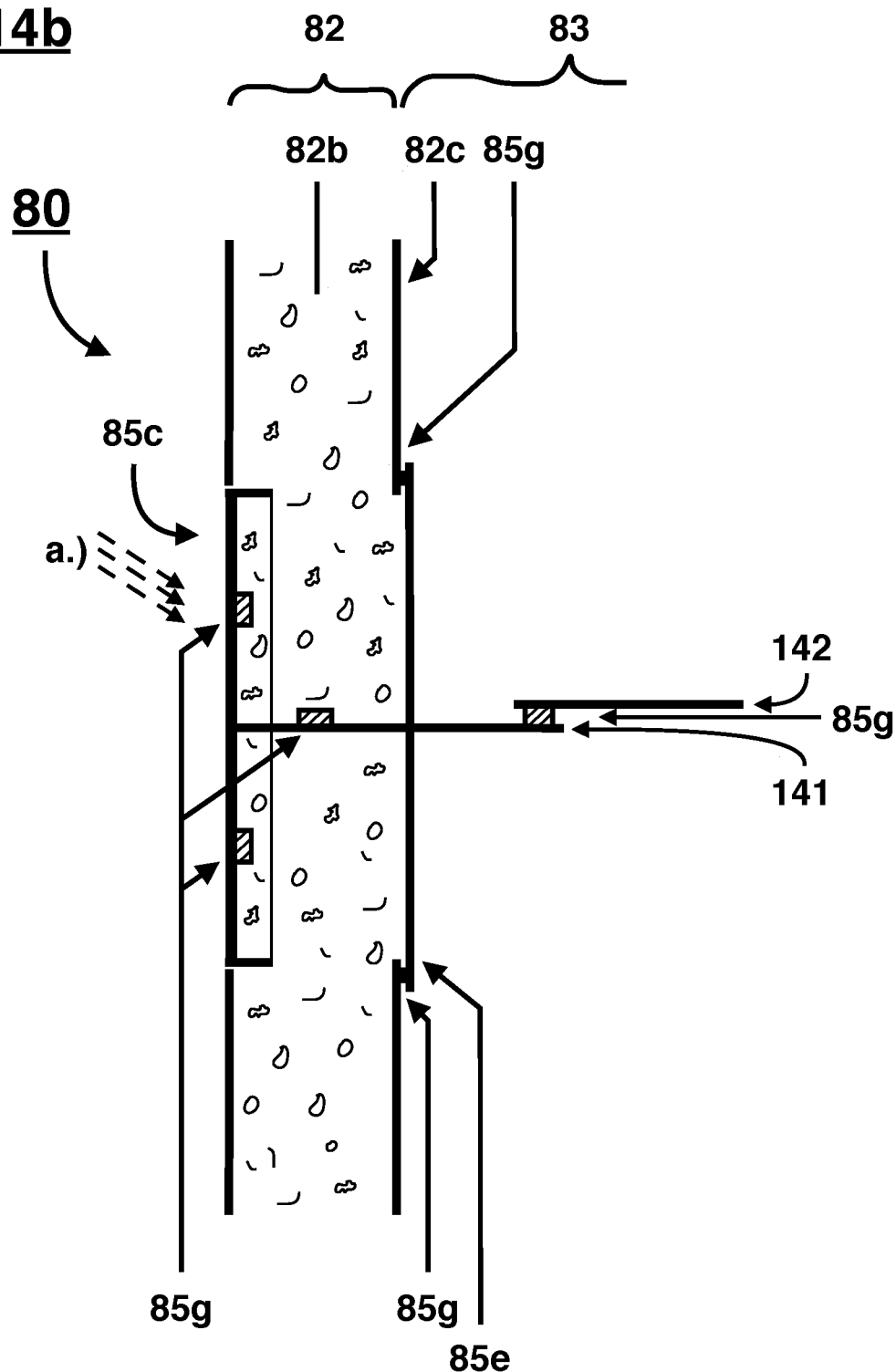

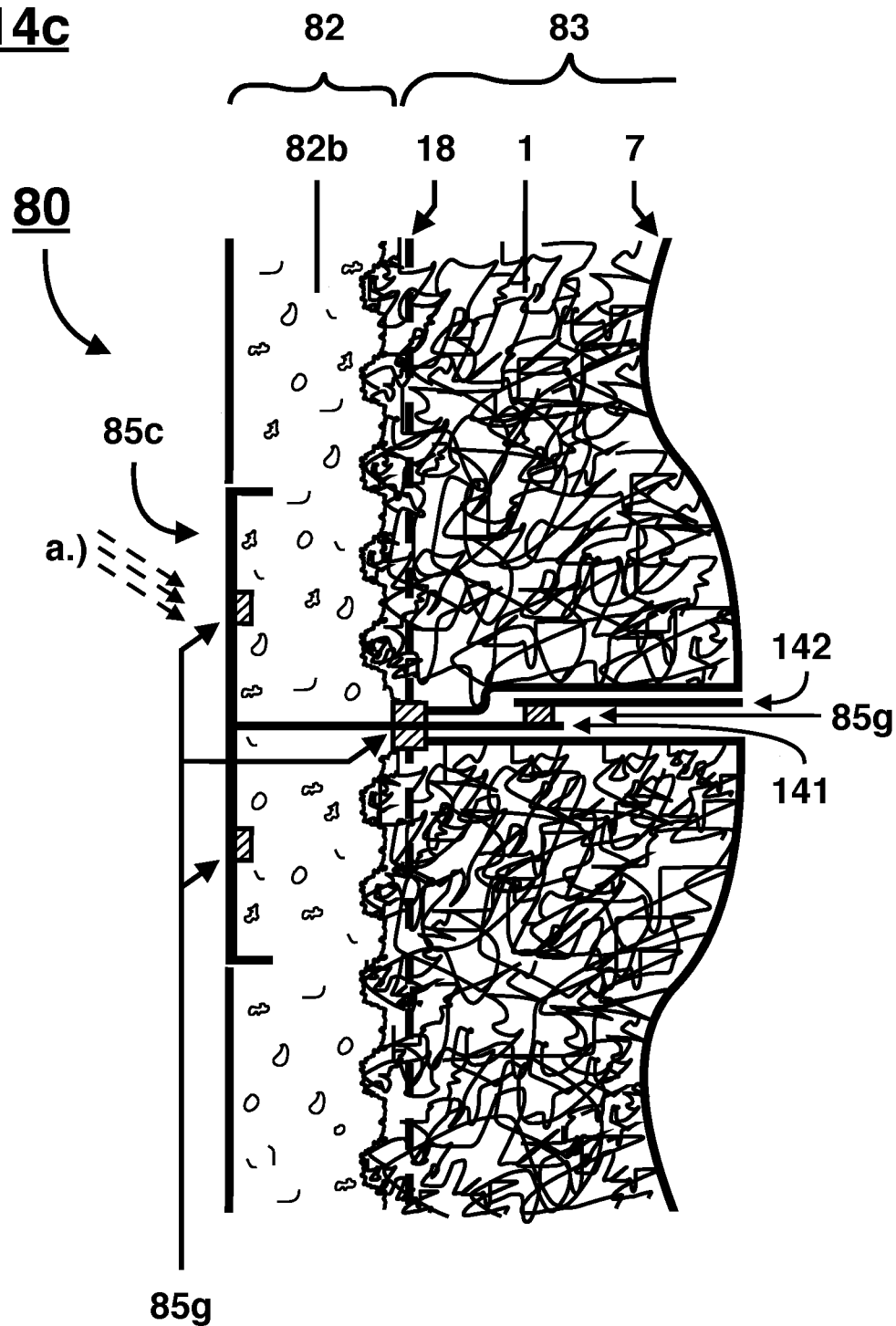

10, 20, 30, 70, 80

10, 20, 30, 70, 80

BUILDING ENVELOPE AND METHOD FOR ADJUSTING THE TEMPERATURE IN A BUILDING

TECHNICAL FIELD

The invention concerns a building envelope, in particular a wall, a floor, and/or a roof of a building with at least two shells spaced some distance apart from one another, which enclose a space, being essentially empty, with the exception of weight-bearing and/or construction-engineering elements, or filled at least in sections with porous, open-celled material, which is sealed from the interior and exterior of the building. It further concerns a method for controlling the inside temperature in a building, which in particular has a building envelope of the aforementioned type.

STATE OF THE ART

Conventional thermal insulation for building envelopes is static. The maximum insulation value is sought, with minimal wall thickness. This corresponds to a maximum decoupling of the interior climate and that of the surroundings of the building. With regards to heat management and the heating and cooling energy requirements of a building, in most climate zones, this state of the building envelope is ideal only for a few days per year. Conditions far removed from the optimum increase energy and resource use, which means that in such cases, heat and/or cold must be brought in or expelled between the interior and the environment by means of complicated, external systems.

Experience with buildings having high thermal insulation have shown that the pronounced decoupling of the inside and outside climates does not automatically lead to energy-efficient buildings. In recent years, discussions carried on among experts concerning building envelopes of administration buildings with high thermal insulation have come to the conclusion that, with high internal loads, this may have a negative effect on the overall energy balance. The high degree of decoupling of the inside from the outside climate leads to greater than average cooling and low heating requirements.

Cooling a building, however, demands a higher share of primary energy, according to the system used, compared with heating, which contributes to inefficiency in most building categories. However, if the inside climate is coupled to the outside climate in the cooling-load case, a large part of the internal loads can be directly carried off to the environment by building envelope with reduced thermal insulation and without great engineering expense. The cooling of the building does however require—depending on the system employed—in comparison to the heating, a higher use of primary energy, which contributes to inefficiency in most building categories. Were one to however couple the interior to the exterior climate in the case of cooling load, then a large portion of the internal load can be expelled directly and without much technical complexity to the environment through the lesser thermal insulation of the building shell.

The function of a building envelope consists in the separation of a building between the building interior and its surroundings. Consequently, two ancillary conditions are relevant. The interior ancillary conditions (IACs) consist of the use as living and office spaces, server rooms, and machinery and supply rooms, of the temporal course of heating and cooling loads and the cycles thereof, as well as the interior climate parameters related to temperature, humidity, and noise. The exterior ancillary conditions (EACs) consist of the structural statics, dynamics, and mechanical impacts, impacts based on weather and climate, and as their temporal course, such as weather and climatic phases and day and night cycles. The relevant structural construction factors are heat, humidity, and noise, their temporal course, and the building geometry. Furthermore, the intrinsic conditions (ICs) of the building envelope are relevant. These consist of the transmission and storage capacities of the structural construction factors within the building envelope. For heat, these are the heat-transfer coefficient, for humidity the moisture transfer capability and the moisture-storage capacity thereof, as well as for sound the transmittance. These ICs are defined by construction, geometry, and choice of material.

Conventionally, structural construction requirements are met with a prevention and decoupling philosophy. In so doing, the structural construction impacts are decoupled from the building surroundings by the building envelope insofar as possible, and the indoor climatic conditions are separately established by central systems. These are shown by research trends, cf. Proceedings of the 10th International Vacuum Insulation Symposium, Ottawa, C A, 2011, along with Bjorn Petter Jelle, Arild Gustaysen, and Ruben Baetens. 2010. "The path to high performance thermal building insulation materials and solutions of tomorrow". Journal of Building Physics:34(2) 99, in the area of thermal insulation and protection from humidity. This approach for handling the structural construction impacts, however, fails to recognize the industrial trend of decentralization.

In addition to conventional insulating materials such as stone and glass wool, fiber and foam materials, systems are also increasingly being used with evacuated layers; so-called vacuum insulation. These are distinguished by a low layer-thickness with very high thermal-insulation efficiency, and they make good solutions with a low construction thickness for difficult geometric circumstances. All these systems are static, however, and they lose their insulating effect due to evaporation, the entry of moisture, damage to the envelopes thereof, and material decomposition over time. Arrangements for building envelopes with variable heat transition exist, cf. U.S. Pat. No. 3,968,831A, DE 3625454 A1, WO 2001/61118 A1, WO 2010/122353A1, WO2011/146025A1, WO2011/107731 A1, CH703760A2, DE 102008009553 A1, and DE 10006878 A1. These can basically be divided into the categories of: 1) vacuum systems, 2) active heat exchange, and 3) wall-heating systems. Furthermore, systems exist with variable heat transition, which are chiefly only achieved with structural measures (variable blinds and canopies, polarized window glass with sun-position-dependent heat transition).

The systems currently available on the market are oriented essentially toward heating requirements and are not at all or only very limitedly in a position to reduce the cooling requirements. The following trends are to be recognized: basically, all systems attempt to reduce the heating/cooling energy requirements. On the one hand, a plurality of construction solutions exists which include phase-change materials (PCMs).

On the other hand, systems have been suggested, chiefly in panel construction-style, which contain a cavity for the purpose of evacuating air, in order to thus be able to vary the insulation effect. The technical expense required to implement these systems, however, is still always too great for automation through the reductions obtained in energy requirements.

As for energy considerations, conventional thermal insulation does poorly with respect to gray energy. Manufacturing thereof is resource-intensive, as well as being very energy-intensive. On top of this, one must also add a volume-intensive transport, which contributes considerably to impairment of the energy balance.

If one were to observe the development of the space heating and cooling requirements of office buildings over the last 40 years, it becomes clear that there exists a high potential for energy savings with a building envelope with dynamic thermal insulation; cf. Gasser and B. Kegel. 2005. *Gebaudetechnik: Faktor 1O* [*Construction Engineering: Factor 10*]. Bau+Architektur [*Construction+Architecture*]: 4/5.
Sdfootnote3sym Through the improvement of the insulation of the building envelope and the increasing mechanization of the workplace, the space heating requirements are understood to be dropping off, whereas the cooling requirements are increasing. A conflict of goals increasingly appears in that good insulation for the avoidance of transmission loss is desired in the winter, whereas in the summer this has a counterproductive effect (reduced cooling of the building overnight). With dynamic thermal insulation, the possibility exists of approaching an optimum U-value for both heating and cooling requirements, whereby in comparison to the situation of today, both the heating and the cooling energy requirements can be reduced.

Bottom line: subject to the condition that heating costs be as low as possible, the ratio between the energy used to heat and cool is visibly being shifted to a greater cooling expense for most building categories. This does however require a greater use of primary energy, which negatively affects energy costs.

PRESENTATION OF THE INVENTION

The purpose of the invention lies in outlining a further development of the building envelope, which, in particular, improves the overall energy balance of the building. Furthermore, the underlying purpose of the invention lies in outlining an improved method for adjusting the inside temperature in a building, which is likewise distinguished by a high overall energy efficiency.

This purpose is solved in its device-related aspects according to relatively independent forms of the invention by means of a building envelope with the features of claim 1 and in the process-related aspects by means of a method with the features of claim 14. The respective dependent claims effectively build on the concepts of the invention.

The invention attempts to achieve an approach for overcoming the physical construction requirements by means of a control and management philosophy. In this, it is sought not to prevent the consequences thereof, but to incorporate them in the concept of a building envelope and by managing them in a controlled manner. The physical construction consequences are linked to the system and their handling is provided for in a decentralized manner. Moreover, the variable and intrinsic dynamic conditions and the inside and outside ancillary conditions are exploited for the heat management of a building.

The area of application of such a building envelope, which possesses continuously controllable heat transition, is chiefly in structures, buildings, and installations with a complex and exacting heat management or with increased noise exposure. On the one hand, these are constructions, structures, buildings, or installations (as well as machinery housings, in extreme cases, also, for example, ship hulls) which have to fulfill a plurality of functions and/or are exposed to extreme internal and external conditions. These may involve external impacts such as those due to weather, climate, or mechanical loads or may consist of internal effects due to processes or applications with severe effects from temperature, humidity, noise, or dust. Specifically to be mentioned are building envelopes for mobile systems (in contrast to immobile systems like structures and buildings), such as modular computer centers, server rooms, and labs that have a standard ISO container construction or similar modular geometry.

The use of a building envelope with continuously controllable heat transition for machinery and installations makes it possible to attain the heating and cooling performance requirements thereof directly through their envelope, which exchanges heat with the surroundings. Thus, costly external heating and cooling installations can be reduced to a minimum. Furthermore, the double-shelled or multi-shelled execution of the construction offers substantial advantages with respect to soundproofing. In combination with porous structures, they can find application as protective or safety envelopes for buildings and installations (explosion protection, etc.).

A further optimization of this system of a building envelope, so as to reduce heating and thermal requirements, is achieved in the case in which heat transition is controlled by targeting it as a whole. There thereby exists the possibility in the heating operations of directing heat from south-facing, sun-lit facade areas into the building and then with the onset of diminishing entry of heat to once again optimize insulation of the building envelope and decouple it from the outside climate. Furthermore, integration of the system into the conventional construction engineering provides a wide field of energy-saving possibilities in the building sector.

From today's point of view, a double-shelled construction is the preferred solution, based upon the consideration of the development of a system with a variable and controllable degree of decoupling as a separation component between the external and internal climates of a building. In order to implement the system, novel sealing systems are needed, on the one hand, for the surfaces and connections, which must satisfy multiple requirements, such as elasticity, adhesion, durability, and temperature resistance. On top of this, one has the proper dimensioning and arrangement of the points of sealing. On the other hand, newly occurring static and dynamic loads inside the building envelope require an efficient building material that makes a versatile construction possible in an economical manufacturing process. The system further requires a method of control which is capable of utilizing a plurality of newly arising effects such as temperature gradients, differing degrees of humidity, and phase transitions within the building envelope for handling the heat management of a building. All these aspects, combined in a system with dynamic thermal insulation and heat exchange, can lead to a significant reduction in the heating and cooling energy requirements of a building.

The basic innovative content of this system of building envelope lies in generally reducing heating and cooling energy requirements, by temporarily increasing heat transition in the building envelope of a structure. Heat exchange is directly accomplished through the surface of the building and is exploited for the heat management thereof. The system has a variable, continuously controllable U-value and actively influences the heat management. Incidental moisture is monitored and removed from the construction, and there are no negative influences, such as material deterioration, on the insulation value. A plurality of effects (for example, temperature gradients inside the building envelope) can be exploited for heat management, by means of the orientation-dependent lay-out of the building envelope into individual sectors. The system is achieved through the novel combination of different technologies and methods.

The system advanced here is optimized in relation to the inputs for use (internal loads) and location (climate zone). This reduces the conventional building technology. Moreover, existing and induced effects inside the building envelope are exploited for handling the heat management of a building, through decentralized coupling to the building technology. The system combines the following components: 1) vacuum systems, 2) active heat exchange, and 3) wall heating systems in various options and includes specific solutions for the construction, for the supply engineering, and for the operation of the building.

The concept describes a system for a building envelope/facade and includes a double-shelled or multi-shelled construction, supply engineering, and a method which allows any optional modification, monitoring, and control of heat transition through the building envelope (no curtain panels). In the internal space in the construction, which is formed either as a cavity or is filled up with suitable, porous, open-celled materials, or one can optional employ a vacuum (to minimize heat transition), or feed in air or gas (to neutralize heat transition), or introduce heat-conducting liquid (to maximize heat transition). The resulting building envelope with a dynamic Li-value possesses a variable degree of decoupling of the interior climate from the surrounding environment. Heat management can thus be directly accomplished through the building surfaces. The technical requirements to be resolved are basically the sealing and calking of surfaces, connections, joints, and penetrations. At the same time, detail, joint, and surface gaskets must be newly developed, materialized, and measured. Additionally, novel supply engineering is required, whereby it is sought to integrate electrical and plumbing components from existing systems.

The system advanced here has a direct influence through the building envelope on heating and cooling requirements and moreover makes coupling to conventional construction-engineering components possible. Additional effects (temperature gradients inside the walls, phase transitions in the intermediate space) can thus be exploited, which further increase the energy-savings potential and thus make the engineering expense for its implementation worthwhile. The building is considered to be a system in which the building envelope, consisting of construction, supply engineering, and management process, forms a system component. Included therein is the approach to maintain additional freedom relating to integrated capabilities (heat, vacuum) and heat-transport media (air, gas, liquids). This allows for maximum exploitation of system conditions for the heat management of a building.

In general, it will be clearly explained at this point that the present invention is not specifically involved with ventilation, air flow, or back ventilation, but it does concern passively or actively influencing or controlling heat transition by means of a wall construction through the devices and constructions to be explained in further detail below. It does not involve heating or cooling (and then "maintaining") a wall shell, such as heat flow propagated within the building envelope, but rather the heat from the outside inward will be controlled (actively or passively). It therefore preferably involves closed systems which exhibit closed circulation.

The object of the present invention concerns adjusting to a specific use or climate zone, in which it is taken into consideration that a conflict basically exists with respect to the specific construction and the heating and cooling function (which is still further explained in detail below). Furthermore, it should be noted that with the present invention, heat storage inside a wall is not involved, but rather it involves heat transport from the outside inward (for instance, from an outside heat collector into a building interior).

The following embodiments for the description of the system can be divided into two aspects. On the one hand, solutions for influence and control of heat transition (increasing/decreasing) by means of the construction are described. On the other hand, measures and devices are advanced which contribute to increasing or decreasing heat transition (thermal input/output) on the surfaces of the construction with the environment.

The construction basically comprises (at least) two spaced-apart shells that enclose an intermediate space at a fixed distance. Said intermediate space is filled by a porous, open-celled material or forms a cavity, with the aid of a spacer. The intermediate space can be evacuated (vacuum) or ventilated with air or a gas, or it can be filled with/emptied of a heat-conducting liquid, as desired. The shells which form a wall, floor, or floor construction in a structure or a housing for a system or machine, are made from a previous loose, flowable, or fluid building material (powder, pellets, dust, concrete, synthetic resin, etc.) that is reinforced shortly after insertion into a shaping form/mold, which sets after a certain length of time and reaches its full strength.

In this way, it is possible to implement the construction with the aid of reinforcement (strengthening, armoring) in nearly any construction shape and using slender construction methods. In the same way, feed conduits, piping, cables, etc. can be neatly routed, molded in, and used. In the final state, the building material must at least be airtight, or even better, vacuum-, gas-, and liquid-tight. The properties required can be obtained with specific additives mixed in. Particular attention is required to prevent or lessen the formation of shrinkage cracks during the setting process. The shells of the construction serve chiefly for statics and the input of dynamic loads, however they can also take on a plurality of further functions, such as transport, storage, and exchange of heat and moisture or protection against mechanical impacts. In order to improve the static and dynamic properties, the building material can either be strengthened by means of fibers/wires or with synthetic materials/additives mixed in or by means of reinforcement (steel, rods made of various materials) or bracing cables.

Inasmuch as, above all, the construction with the system of slender structures as well as housings for machines and systems is taken into account, a further type of reinforcement must be considered: the static and dynamic joining of outer, holohedral reinforcement with the building material (sheet-metal—concrete bonds). In so doing, the holohedral material can exhibit, on one hand, inclusions, pores, or bulges or it can be provided with a porous, open-celled binder, a non-woven material, or a fine-meshed lattice. The static, dynamic bond comes to be inasmuch as the building material flows into the open pores during the installation process, then sets, and is then bonded to the holohedral material. In addition to directionally-defined loads, this type of reinforcement can also take up undefined directional loads (oscillations, vibrations, etc.), and thus further strength can be lent to the construction. Furthermore, this type of reinforcement offers advantages for the application of vacuum technology.

The construction can further be pre-stressed with the aid of a steel reinforcement. This serves, on the one hand, to improve the static and dynamic properties of the building material or contributes to the lessening of the formation of shrinkage cracks. At the same time, the steel reinforcement is provided with a heat-insulating surface coating and is heated up before the installation process (by an electrical current, for instance). In the installation process, a difference in temperature must be maintained between the building material and the steel reinforcement until the building material begins to build up strength. By subsequent, delayed cooling off of both media, pre-stressing can be attained due to linear expansion.

Measurement devices and sensors are built into the two shells and/or the intermediate space, (for temperature, moisture, acceleration, vibration, etc.), in order to receive input signals for controlling the system (control process). In other respects, the construction consists of a building material, mixed with specific additives and a reinforcement.

In order to describe the manner of functioning and the properties of the system, a short overview is provided here relating to the aspects of heat conduction and thermal insulation. Heat transport in insulation materials results due to the heat conduction a) of the air and/or gas contained therein, b) of the solid conductivity of the insulation material, and c) thermal radiation. The main share of heat transport in insulation materials results from the air/gas contained therein by means of convection, gas-thermal conduction, and free molecular flow. If the insulation material (in this case, we designate it as a support material) is evacuated, then attention must be paid to the relationship between the thermal conductivity of the porous, open-celled insulation-support material and the inside air and/or gas pressure.

If the share of thermal conduction by the gas phase is severely reduced by evacuation (vacuum insulation with low thermal-conductivity numbers, 'A<0.01 W/mK), then the share of the heat transport by thermal radiation can no longer be neglected. In this case, specific precautions must be taken to screen the thermal radiation. Heat conduction by the solid conductivity of the insulation material can only slightly be affected. The possibilities for further reduction of heat transition are thus limited.

The relationship between pore size and the internal gas pressure of the support material and the thermal conductivity resulting thereof will be laid out and optimized taking into account the use on the one hand, and the exposure of the building to climate on the other hand. The intermediate space of a double-shelled or multi-shelled construction can therefore basically be laid out in a number of ways.

In order to minimize heat conduction by convection, the intermediate space can be filled up with a porous, open-celled insulation support material which is bound by tension and pressure to the shells. If the intermediate space is additionally evacuated, the gas-thermal conductivity can also be significantly reduced. The porous, open-celled support material in the intermediate space can consist of pre-fabricated plates made of a hard foam material or a binding material manufactured from fibers (glass fibers, synthetic fibers) and a binder/adhesive (concrete, synthetic resin), which is applied in such a way (in the form of plates or directly to the construction, reinforcement) that the strengthened material can absorb loads and is open-celled. In the future, an additional method (3-D printing) can also be imagined for manufacturing porous, open-celled support material in order to attain the pore size that is predetermined on the basis of the interpretation of the system. When introducing the building material into the form/mold, it must be ensured that it only penetrates into the pores of the support material providing the spacing, until adhesion is guaranteed.

On the other hand, in order to increase heat conduction by means of a heat-conducting liquid in the intermediate space and to make a rapid change of conditions in the intermediate space possible, it can be formed as a cavity, which is stabilized and fixed at a distance with the aid of spacers. The dimensioning, choice of material, and distribution of the spacers per $m^2$ on the surface are determined by the resulting forces based on the negative or positive pressure in the intermediate space. On the one hand, said spacers can be casings or solid or hollow rods made of a material with the highest possible strength and lowest possible thermal conductivity. On the other hand, the spacer can be formed as a so-called spacer element. This may, for instance, be a previously evacuated, hard-foam material sealed with synthetic resin, which exhibits the necessary strength and possesses a low heat conduction coefficient. Anchoring the spacer in the shells results by means of an anchoring element previously inserted into the shells, which is fixed after installation by the building material. The spacers must assume the following functions: on the one hand, they must absorb both the static and dynamic tensile and pressure forces that result due to the different physical conditions in the intermediate space, and they must fix the shells at a certain distance apart. Because the spacer forms a constant heat bridge in the construction, it should, on the other hand, possess as small a thermal conductivity as possible and make as punctiform a contact with the shells as possible. This is achieved with a material with a high strength and low thermal conductivity, in order to be able to design the embodiment to be as thin as possible. In addition, spacers must additionally fix the form/mold during the installation process and take up the form pressure of the fluid building material and of the support medium.

A third variant for forming the intermediate space is a combination of the two preceding types of construction. This is produced with a slotted or notched, porous, open-celled support material, which likewise has a cavity for evacuating and filling with a liquid. This type of construction allows different and mixed conditions to be induced in the intermediate space in order to optimize gas and convection thermal conductivity.

It is shown that there is basically a conflict of interest between the dynamic thermal insulation and heat exchange of the system. On the one hand, it is sought to increase heat transition through the construction by means of introduction of a heat-conducting liquid into the intermediate space and to attain a rapid exchange of conditions. This can be achieved with the embodiment of the intermediate space as a cavity. But if said intermediate space is evacuated, only a moderate thermal insulation value results, due to the geometry. If, on the other hand, the intermediate space is filled with a porous, open-celled support material for the purpose of minimizing heat transition and it is evacuated, the conditions in the intermediate space can only be changed slowly due to the pore size. Additionally, the introduction of a heat-conducting liquid is only carried out in a limited manner, inasmuch as said liquid (the remaining residual moisture) can only be completely removed with difficulty. This inevitably leads to the fact that the system must be specifically designed taking into account use and specific climate zone. The selection and determination of the pore size of the support material, as well as the lay-out of the intermediate space will be defined and optimized based on energy estimates for use and climate zone, whereby an optimal U-value range is achieved.

The forces acting upon the shells and spacers, which are provoked by the various conditions in the intermediate space, amount in the case of a vacuum to a maximum water column pressure of 10 Mp/m$^2$, as well as a maximum water column tension of 1 Mp/m$^2$ per meter. On top of this, there are Dynamic loads which are provoked by the exchange of vacuum, gas, and liquid. In any case, the distance-stabilizing and fixing material in the intermediate space (support material, spacer) must absorb the resultant forces. In order to be able to further increase heat transport through the construction, heat transition must also be improved (the heat input or the heat output) from the building envelope to the environment. This occurs basically by increasing the surface area. If the construction is executed of concrete, or similar, this can be executed using exposed concrete aggregate or sandblasting. If the surface is made of sheet metal, or similar, this can be executed as ribbed or corrugated sheet-metal. Additionally, heat output and heat transition may be influenced by a heat-absorbing or heat-desorbing colored coating on the building surface (color-changing coatings are optimal).

Furthermore, the moistening of the building surface with water, or similar, can further increase the resultant volume of heat to the surface by means of liquefaction/evaporation of the heat transition. In each of these cases, it must be ensured that the building environment does not restrict the flow of draft air or the exchange of the volume of air.

One embodiment of the construction consists of the separation and division of the building envelope of a structure or installation into individual sectors or orientation-dependent parts and planes. At the same, the lay-out of the corresponding intermediate space (pore size, support material, geometry) can differ between the individual sectors.

Basically, the intermediate space is therewith divided up by means of a construction aid into individual compartments and sectors, which are separated from one another and whose internal states can be varied independently of one another as regards the intermediate space (vacuum, gas, heat-conducting liquid). This serves for the purpose of exploitation of orientation-dependent arrangements of the building envelope (whether the exterior side is in the sun or shade, different uses on the inside), and it is exploited for the heat management of the structure or installation by means of the management process. In order to exploit the effects (temperature and pressure gradients on the inside of the building envelope) still further, they can be applied to surfaces corresponding to the individual sectors with measures for increasing heat transition to the building surface, as described in the preceding section. The separation surface between the intermediate space and the shells can be sealed with a film or synthetic membrane, or a metal sheet, sealed with a resin or adhesive or with a surface sealant which is bonded to the building material.

A further embodiment of the construction comprises piping circuits laid in one or both shells (for instance, aluplast floor-heating pipes), through which a heat-transporting liquid can flow by means of liquid or circulating pumps, in order to exchange the heat in the shells and to utilize the effective heat-storage mass thereof for the heat management of the structure. The piping can be arranged in the construction shells in a radial, circular, spiral, or looped shape. When arranging several different circulation systems inside the building envelope, the temperature gradients that occur can additionally be exploited against one another and can be used as heat sources or heat sinks in connection with coupling to conventional construction-engineering (heat pumps, cooling systems).

Additionally, controlled humidity can be introduced using permeable piping in the construction, which upon transition through to the surface evaporates. The evaporation heat being released can additionally be exploited for the heat management of the building. The permeable piping can also be installed in the intermediate space, embedded in the support material. In this embodiment, said piping can, on the one hand, be used as a feeding means for the regulation of the air or gas pressure. On the other hand, it can also be used to introduce moisture into the support material. This induces physical effects such as increased heat conduction, a better thermal radiation ratio, and a greater thermal capacity inside the support material.

In accordance with one independent aspect of the invention (which can preferably be combined with the aspects already explained), a building envelope, in particular a wall, a floor or a roof of a building, is indeed proposed with at least two spaced-apart shells, which enclose a intermediate space sealed against the interior and exterior of the building, said intermediate space being, with the exception of weight-bearing and/or construction-engineering elements, essentially empty or filled at least in sections with porous, open-celled material, whereby a plurality of first partial pipe sections is arranged in the intermediate space, which are joined to a heat collector onto which are bonded the shells facing the outside and which end at the intermediate space. Preferably, a plurality of second pipe sections is arranged in the intermediate space which are joined to the shell facing the intermediate space, in particular a heat collector at the shell facing the inside and which end at the intermediate space, in which a first pipe section forms a heating pipe with a second pipe section.

A core concept of this aspect lies in the fact that heat transport (that can be regulated) can take place through the pipe sections from the inside and outside (and the reverse). It is hereby essential that the intermediate space be sealed. A (heat conducting) fluid can thereby be filled into the intermediate space. In combination with the (heat-conducting) fluid, heat conduction (that can be regulated) can be enabled, inasmuch as the (heat-conducting) fluid is filled into the intermediate space, in such a manner that it adjoins the first pipe section or the heating pipe (comprising the first and second pipe sections). In this aspect, however, it does not involve providing piping in order to make heat storage possible inside the building envelope, but rather in order to make heat transport possible from an outside area (particularly an external heat collector) to an inside area (particularly an internal heat collector). Preferably, both of the pipe sections attached to one another are therefore laid out as two interlocking pipe sections.

In a specific embodiment, one end segment at a time of a second pipe section is attached inside an end segment of a first attached pipe section (contact-free). Alternatively, one end segment at a time of the first pipe section can be arranged inside an end segment of a second attached pipe section (contact-free). The pipe sections thereby preferably interlock with one another. Distancing the attached end segments from one another is preferred. A space which is preferably free (so that the attached end segments do not move) for joining thereby remains, which is formed by distancing the end segments. In such a case, it is advantageous if a (heat-conducting) fluid can penetrate through the joint space into the pipe section, so that a heat-conducting joint is achieved between the end segments. Regulation of the heat conduction then preferably occurs, in that the joint space is bridged in a heat-conducting manner by the (heat-conducting) fluid, in particular a heat-conducting liquid, (or simply not, by removal of the fluid). In a specific embodiment, the joint space can also exhibit a (heat-insulating) gasket. A fluid-conducting joint is thereby made possible between the pipe sections attached to one another, so that the corresponding heat pipe can carry out the transport of fluid (particularly fluid circulation). In such a case in particular, a liquid pump can be arranged at the first and/or second pipe section, through which the flow rate of a liquid, and consequently heat transition, can be regulated. In a specific structural embodiment, one end segment at a time of a second pipe section is arranged concentrically within an attached end segment of a first pipe section. Conversely, one end segment at a time of a first pipe section can also be arranged concentrically inside an attached end segment of an attached end segment of a second pipe section.

In a further embodiment, an interacting fluid circulation is achieved with the inner and outer shell by means of the heat pipe. The heat pipe can exhibit a central pipe segment which preferably lies inside a double-walled second pipe segment (for the return of a circulating fluid).

In a manner according to the method, regulation of the heat passing through can take place as follows. The (heat-conducting) fluid can be introduced to increase the heat passing through in pipe sections attached to one another. Alternatively and additionally, the liquid surface of a fluid formed as a liquid can be set at the height of the pipe sections (attached to one another) or above the pipe sections (attached to one another) or over the pipe sections (attached to one another). To decrease the heat passing through, a (heat-conducting) fluid can be removed from the pipe sections. Alternatively or additionally, the liquid surface area of a fluid formed as a liquid can be set at the height of the pipe sections (attached to one another) or above the pipe sections (attached to one another).

A further embodiment of the construction involves so-called heat pipes, which can further increase heat transition through the construction. There are basically two pipes, arranged concentrically at some distance and leading into one another (manufactured from a good heat-conducting material such as aluminum, copper, or chromium steel), which are connected to a heat collector on the outside of the shells and which project through the shells into the intermediate space. At the same time, it is important that they do not contact one another and that they only project to a certain point in the intermediate space. The heat collectors (made of a good heat-conducting plate), arranged on the outside of the construction, are now in direct heat exchange with the immediate surroundings and can also further conduct the heat from direct sun irradiation to the pipe joined thereto and projecting into the shells and the intermediate space. As long as the intermediate space is now evacuated, no heat-conducting connection exists between the two pipes. If the intermediate space is now filled with a heat-conducting liquid, increased heat transition thereby results from one heat pipe to the other. This arrangement thus forms a passive heat bridge inside the construction and thereby increases heat transition. In particular, the heat pipes act as a bridge for the heat transition of the separation layer between the shell and the intermediate space. If the intermediate space is now further emptied of the heat-conducting liquid, the additional effect disappears for heat transition inside the construction. Because the heat pipes do not touch, they also no longer form a heat bridge in the construction. The function of the heat pipes is dependent on two levels of heat-conducting liquid in the intermediate space of the construction. If the level lies below the heat pipes, there is no increased heat transition. If the level is above the heat pipes, there is increased heat transition. For improved emptying of the heat pipes of the heat-conducting liquid, said pipes can be conical in shape or provided with holes for emptying. In order to improve and increase heat transition by the heat-conducting liquid, said liquid can be mixed with and enriched by a heat-conducting material. It is optional to execute the spacers in connection with a heat pipe. In order to further increase the heat transition of the heat collector, the aforementioned measures can be used to increase heat transition to the surfaces.

The concept of heat pipes can be further extended to dynamic thermal insulation and heat exchange within the system. Thermodynamically, the following principles of heat transport exist within a building envelope:

passive heat conduction (solid heat conduction by the construction and its devices,
heat transition to its surfaces and/or separation surfaces),
active heat transport (convection, reverse ventilation, heat conduction through the transport of air/gas or a liquid by means of the supply engineering),
evaporation/liquefaction in an open system (moisture inside the construction and on its surfaces, by means of permeable pipe in supply engineering), and
evaporation/liquefaction in a closed system (heat-exchange elements as sources and/or sinks through the transport of a cooling means and/or compression refrigeration machines and heat pumps).

These thermodynamic effects can be integrated through collectors for heat input and heat output to the surfaces, as well as with a heat-bridge-minimized mode of construction in the heat pipes. These can in addition be coupled to the construction engineering components. When distributed over the surfaces, the heat pipes maintain a decentralized increase in heat transition in the building envelope.

By coupling to conventional construction engineering, the degree of decentralization can be further increased. The following measures increase the operation and efficiency of the heat pipes: in order to increase the heat input and output of the heat pipes at the heat-conducting liquid, the surfaces of said pipe can be formed out of ribbed or corrugated profiles. In order to increase the heat transition of the heat pipes or of the heat collectors thereof to the circulation piping laid out in the shells, said piping can be insulated or wrapped in sections with heat-conducting plates (copper, aluminum) and can be joined to the heat pipes or to the heat collectors thereof. In order to increase the heat input or output of the heat collectors to the environment (inside or outside), said collectors can additionally be coupled to specially mounted cooling bodies or heat-absorption materials.

The geometry of the building surface must be optimized with controllable heat transition in accordance with the range of applications and purpose of use for the building envelope. If the focus is on limited heating and thermal requirements, the building architecture must make the building surface as small as possible. If the focus is on limited cooling performance requirements, the building surfaces should be maximized. The same holds true in applications for machinery and installations. In order to be able to exploit a highly effective storage mass, concrete and variations thereof are favored as a building material. Additionally, it offers good properties in connection with heat radiation. The construction and expansions thereof can also find application in a single-shelled embodiment.

The construction joints such as splices, joints, transitions, or penetrations (conduits, piping, cables) basically have the function of sealing individual components between one another, against the intermediate space, against the interior and/or the exterior, and against the building material or sheet metal, film, or a sealing membrane. Sealing must be achieved when working against a vacuum, gas, and liquid. It is clear that the system, extended over the entire structure, cannot be made completely "sealed". The goal is not perfect sealing, but a fixed leak rate that can be monitored, which can be optimized and minimized by means of the process. In so doing, the energy expenditure required to establish and maintain the required vacuum and the U-value range resulting thereof is compared to and energetically optimized for by the heating/cooling energy expenditure relative to the corresponding U-value range. Standard commercial sealing systems, such as lip gaskets or O-rings can always be used. However it is central to the operation, durability and service life of the system that the sealing of the construction connections may also be subsequently, which is to say following the construction, influenced and improved. At the same time, sealing sites are executed in a manner and combined with materials in such a way that they can be influenced from the outside and thus can impinge upon the sealing. A simple example of a sealing site, which can be subsequently influenced from the outside is, for instance, the introduction of bitumen (in the form of a sealing membrane or tarpaper) above a groove, spur, or simple elevation between concrete and sheet metal, or similar. If the sheet metal is heated from the outside, the bitumen then melts, flows into the empty space, the groove or the like and seals the sealing site anew upon cooling off. This process can be repeated as often as desired and thus makes monitoring the sealing site possible. The drawback to this solution is that the bitumen only flows downward. Consequently sealing sites cannot be sealed "upward". Thus a sealing material is forced in which increases its volume in a direction-independent manner upon outside action. Examples of this are the so-called fire-protection seals on doors and windows, which increase their volume upon the action of heat and by means of their lay-out in the door or window crevice prevent the passage of heat and smoke. It is, for example, possible to exploit heat, electromagnetic radiation, chemicals, or mechanical forces as a means of outside action.

The action of heat at the sealing site can result, on the one hand, by means of heat-conducting plates built into the construction, which enables heat transport from a site accessible from outside or inside the construction to the sealing site. The impact on the sealing site then results from heating up the heat-conducting plates from the outside of the construction or by heating up the same by means of the heat-conducting liquid in the intermediate space or the circulation piping in the shells. On the other hand, heating wires can be integrated into the sealing material, which can likewise be operated from outside the construction. In this case, even a variable leak rate can be obtained which can be monitored. In the case of impact of electromagnetic radiation, it must be ensured that it is not screened by the construction materials laid on the outside. In the case of impact of chemicals, either fine, permeable tubes can be integrated into the sealing material, or the chemicals can be directly installed in the intermediate space of construction. With all these applications, the cycling capacity must be ensured for repeated application. Additionally, it would be advantageous if the sealing material is discharged with an expansion in volume of a resin, or similar, which cures and thus further improves the sealing site. This process should be able to be repeated as often as desired. The various structure connections are then executed so that an impact from the outside is possible at the sealing site. In conclusion, the sealing process can be summarized in three steps. First, the contact and sealing surfaces are joined together and possibly bonded. They are thereupon joined under the action of form pressure during the installation process (in some cases, it is even possible that the impact takes place at the sealing sites already during the installation process). Finally, the impact can take place at the sealing site from the outside as described above.

The following construction aids find application: in order to prevent the sealing sites from failing in a localized manner, they are either embodied on heat-conducting panels or are executed by means of so-called sealing and fastening flanges and cut-out holes in the surface gasket or the panel. In order to anchor panels (heat-conducting plates, diaphragms, flanges) in the building material, these are bent and provided with holes or connected to a reinforcement lattice or non-woven material, in such a way that the building material penetrates the same during the installation process, solidifies itself, and thereby sets the connection.

The construction embodiments describe, how windows, doors, passages, connections, and penetrations such as conduits and piping, on the one hand, as well as steps, corners, and edges, on the other hand, are integrated into the construction. They demonstrate how the sealing problems are solved in each individual case. In so doing, the different types of construction (intermediate space executed with support material, formed as a cavity or notched support material) can be combined with one another. In the area where windows, doors, or external components are secured to the construction, as well as in corners and steps, one can consider to form the construction with porous, open-celled support material in the intermediate space, because these sites are sensitive to heat bridges. The surfaces can then be divided into sectors or formed as desired. In order to achieve an improved sealing effect, the components can be embodied in a conical shape. The junction or seal of the construction can be embodied as open or closed in such a way that the cavity is secured over the entire cross-section with a sealing frame, which forms a reduced heat bridge.

With this, the special structural construction features of the system should be introduced at this point. In spite of the minimal thickness of the embodiment (wall, floor, and ceiling thicknesses), high temperature and humidity gradients can be absorbed inside the construction. Due to influence exerted on the physical state in the intermediate space, the course of the gradients inside the construction can be actively affected. In the case of the temperature course, heat transition can always be influenced and controlled. Vapor pressure can, on the one hand, be addressed through the use of a vapor lock (panel, film) on the inside of the intermediate space in order to prevent condensation of the moisture inside the construction. On the other hand, moisture arising inside the construction can be absorbed and, with the aid of the system, be actively transported out or exploited for the heat management of the building. Based on the lay-out of the intermediate space, the dew point always lies outside of the area in which moisture arises and could condense. Consequently, it protects the system from moisture damage.

Because the construction embodiment is set out for a building use and climate zone, it comprises an optimized "pore size" for the support medium, which can range from a nanometer scale to an open cavity. In addition to pores, this may also involve surfaces, i.e. the intermediate space can be divided up into several separation layers. The structure-contingent effects, such as low gaseous heat conduction with small pores or improved replacement rate for a heat-conducting liquid with large pores, must be appraised, carefully weighed, and optimized against one another.

The manufacturing process of the construction and of its expansions, as already mentioned, in particular makes use of a building material, which was previously loose, flowable, or fluid (powder, pellets, dust, concrete, synthetic resin, etc.), which hardens after insertion into a shaping form/mold and after some time, develops their full strength. The internal and external physical conditions of the manufacturing process (filling, setting, and strengthening process) are the same conditions as those of the fluid phase of water. The building material should possess the highest possible gas and vacuum tightness, as well as good heat and moisture conduction. The process of introducing a flowable building material can occur either from above through a form/mold or be pressed upward from below and be sealed by means of a drilling jar. In so doing, the flowable building material is either integrated with a pump (a concrete pump) or with the aid of a pressure-equalizing reservoir by means of hydrostatic pressure. The second method may become necessary in certain cases inasmuch as the pump method induces pressure waves in the flowable building material during the integration process, which can negatively affect the form/mold.

The simplest, but also the most expensive, method for making the construction consists of building, for each individual shell, a form/mold, on site or in component-construction mode, and subsequently filling it with the building material. The goal, however, is to manufacture the construction and its expansions in one procedure. In so doing, basically two problems are posed. On the one hand, the building material must be prevented, with the aid of a separation layer between the shells of the construction and the intermediate space, from flowing into the intermediate space during the installation process. In order to prevent this, said separation layer can be executed as a holohedral embodiment with a film, a non-woven material, panel, or a surface-sealing membrane, which is subsequently bonded to the building material. On the other hand, the separation layer must be set and stabilized during the installation process, inasmuch as the hydrostatic pressure of the fluid building material affects the same (the pressure of the form). This is achieved with the simultaneous introduction of a support medium (liquid, sand, granulate) into the intermediate space during the installation process. In this, attention must be given to the fact that the level of the support medium and of the fluid building material lie at the same height at all times. The material density of the support medium must always correspond with the scale of the density of the fluid phase of the building material.

Due to inertia, internal friction, or resistance to friction on the surfaces, deviations in the density of the support medium can occur. If a loose solid is used as support medium, it is not the density of the solid but rather its bulk density that determines how the manufacturing process is carried out. If a support liquid is used, an additive can be added which seals the inner surfaces of the shells during the removal of said liquid from the intermediate space. In order not to impair the heat transition through the separation layer between the shells of theconstruction and the intermediate space, the same should be executed in a material that exhibits a good heat transition. In the following, various manufacturing and installation methods are advanced.

If the intermediate space is filled with a porous, open-celled support material, it is possible to previously omit a separation layer between the intermediate space and the shells, whereby the building material can flow into the open pores of the support material in the installation process, and can be bonded to it and hardened. The separation layer between the shells of the construction and the open pores of the support material is formed at the penetration depth of the building material. At the same time, it must be ensured that the bond of the support material with the hardened building material can absorb the resultant surface forces (tension, pressure). Inasmuch as the separation layer forms the sealing surface between support material and shells of the construction, it must possibly achieve a high level of density. The area on the surface of the support material into which the building material has penetrated and has hardened, acts as a good reinforcement. The solid conductivity achieved with the cured building material prevents and stops the formation of cracks in the area mentioned. The density of the separation layer can be increased further if any additives are added to the concrete (synthetic resin, silicon, oil, amongst others). In this case, two possibilities exist. On the one hand, the physical and chemical properties of the additive (density, surface tension) will enable the flowable building material to always be at the surface. If the building material/additive mixture penetrates into the open pores of the support medium, the separation layer is formed at a defined penetration depth on the liquid front. On the other hand, the additive (with a density less than that of the building material) can be administered to the fluid building material during the installation process above. If the level then rises when introducing the fluid building material, first the additive wets or flows into the support material, followed by the fluid building material. The additive is then once again found at the liquid front and consequently can form the separation layer at a specific penetration depth by hardening. The penetration depth can be controlled by means of the pore size of the support material, the form pressure, or the viscosity of the fluid building material or of the additive. If the separation layer is formed in this way, then an increased vapor or moisture barrier also results. In order to also increase protection against heat radiation with low heat transition numbers for the support medium, fine metal lamellae should be added to the additive (made of a film or aluminum, for instance), whose size is smaller than the pore size of the support material. These then likewise flow with the additive as a carrier material into the support material and are part of the separation layer. Heat radiation occurring from the outside is now scattered to the metal lamellae and is damped in its propagation by the material of the additive (synthetic resin). This effect eliminates the problem of the formation of transverse wave excitation.

In order to prevent the building material from penetrating too far into the porous, open-celled support material in the intermediate space, an adhesion- or hardening-promoting additive can be added to the building material, which is activated on contact with the surface of the support material. The additive can also be a two-component chemical. In such a case, the first component is previously applied to the support material, whereas in the installation process the second component comes into contact with the first, it reacts and can harden.

If the intermediate space is formed as a cavity, several possibilities exist for its manufacture. On the one hand, a solid, holohedral support material can be applied for the reinforcement of the one shell, said material having a thickness corresponding to the separation distance from the intermediate space. This support material has the property that, after the occurred process of introduction of the building material into the form/mold, its physical or chemical properties can be altered from the outside in such a way that it is thereupon flowable or fluid, and in this way the intermediate space can be emptied of the support material. This may be, for example, a wax, or similar, which can be thoroughly melted by raising the temperature in the shells (a salt or ice can perhaps be used as well). The support material can however also be compacted slab-shaped sand, which can be shaken/vibrated out, or a material (polystyrene, or similar), which can be made flowable with a liquid (etched out).

Another installation method requires the possibility of being able to promote the process of hardening the building material at the intermediate space separation layer and of accelerating it, by means of a flowable substance as a support medium. This presupposes that the building material, in the flowable phase, cures more rapidly or immediately in contact with a hardening-promoting liquid/substance (a curing agent, an adhesion-accelerator, a hardening accelerator). A fine non-woven material/lattice with a small mesh width or pore size is then set up or mounted on the shell reinforcement. The support liquid, which is introduced into the intermediate space for the purpose of compensating for the hydrostatic pressure of the building material, is then mixed with the hardening-promoting substance. It is introduced in the installation process at the same rate as is the flowable building material. In so doing, attention must be given to the fact that the level of the building material is a little above the level of the support liquid at all times. The flowable building material then penetrates the non-woven material/lattice in the installation process and comes into contact with the support liquid in the intermediate space, which is displaced by the hardening-promoting substance. In so doing, the building material in the area of the non-woven material/lattice sets and consequently the separation layer of the intermediate space to the shells emerges. During the installation process, attention must be given to the fact that the fill rate is adjusted to the bonding rate of the building material in the zone of contact with the support liquid. With embodiments of floors, walls, and ceilings, angle brackets must be introduced into the corners in order to ensure that the level of the flowable building material is always above the level of the support liquid in the intermediate space and no intermixing occurs. Alternatively, the non-woven material/lattice can be wetted or saturated in advance with the hardening-promoting liquid (curing agent). In the installation process, the flowable building material is now hardened while passing through the non-woven material/lattice. The problem of the installation method just discussed in the case of the cavity lie in the fact that support liquids with suitable densities are difficult or expensive to manufacture. In contrast thereto, a support liquid can be used, with large pore sizes for the support material, to monitor the penetration depth of the flowable building material in the pores of the support material.

An alternative manufacturing process uses a granulate (granules, glass pearls, or similar) as a support medium, which possesses a low internal or inherent friction. In this case, the separation layer is formed as above, or a panel, a film, a non-woven material, or a surface sealant that is bonded to the building material must be applied between the shells and the intermediate space. Additionally, either an oil, or similar, can be added to the support medium, in such a way that the granulate does not remain stuck to the separation layer, or it can be intentionally bound to the separation layer. The advantage of this method is that a suitable density, in this case the bulk density, is easy to achieve. Furthermore, a granulate has the advantage that it is easy to handle (pumps with a concrete pump) and can readily be removed from the intermediate space after the installation process.

As already mentioned, the adhesion and sealing sites between the separation layer and the structure connections can be hardened and sealed by the action of the hydrostatic pressure of the flowable building material during the installation process, and additionally by heating the shells. As an alternative to a granulate as a support medium, mechanical aids, such as inflatable hoses or the like can be used.

Basically, three different processes for the manufacture of the construction can be applied. On the one hand, it can be prepared entirely in an element construction form, in which the size and weight of the elements are determined by their transportability. The advantage of element construction lies in the good quality control of the manufacturing process. The drawback are many and long sealing sites between the elements at the time of assembly of the building envelope at the construction site, which has a negative effect on the leak rate. On the other hand, the structure can be completely assembled and manufactured on site at the construction site. The advantage to this lies in the reduction of the number of sealing sites. The disadvantage is the difficulty of monitoring the quality of the workmanship inside the building envelope and the more difficult conditions at the construction site. A third possibility for manufacturing the construction is a course which lies somewhere in between that of the element construction and on site construction. In this method, the construction is prepared in advance in so-called form elements. All the components, such as reinforcement, separation material, spacers, sector divisions, conduits, and pipe, etc. are assembled in advance on an element form. These are subsequently assembled on site at the construction site, sealed against one another, and filled with the building material. The quality of the components can thereby be well monitored, and it avoids the problem of many, long sealing sites, inasmuch as the building material is now integrated throughout all the elements in the form.

The manufacturing method discussed above also permits a multi-shelled embodiment of the construction.

Supply engineering, which brings about the functioning and operation of the system, on the one hand is made up machinery and assemblies, that generate vacuum, convey and compress air or a gas or pump and circulate liquids (vacuum pumps, compressors, and liquid and circulation pumps). Conduits and piping systems are required for this, which can be provided with valves, as well as controlled and switched on and off. In addition, measurement equipment and sensors (temperature, pressure, humidity, etc.) are built into the construction and positioned in the surroundings and which deliver the input signals for the control system. This provides output signals with the help of a program, which then, in turn, operate correction elements and actuators. It is of central significance for the functioning of the system to have available a transport and storage medium for heat capacity, and negative pressure or vacuum capacity. In the case of heat capacity, said medium can be water, a water mixture, or any liquid. The supply engineering involves, on the one hand, a storage tank such as the simple water and liquid storage tanks that are conventionally employed in construction engineering. On the other hand, storage tanks for a vacuum are also needed, in order to increase and generalize the functioning and efficiency of the vacuum pump. The transport and storage medium in connection with storage tanks generates static or mobile capacities of heat and vacuum, which utilize the system for their functioning.

Furthermore, apparatus and devices in the supply engineering can be coupled to conventional construction-engineering systems (heating, cooling, heat pumps, etc.), and thus newly resulting synergies can be exploited for heat management in the building, structure, machinery, or installation.

The expansion of supply engineering consists of permeable, or alternatively air-, gas-, or liquid-permeable pipes. These are radial, circular, spiral, or looped in shape in the shell of the construction, laid out in the sector divisions or the support material in the intermediate space of the construction. The pipes, through which a gas, moist air, or a liquid flows, can on the one hand feed or purge amounts of heat from the surrounding material. On the other hand, they can also feed or purge moisture. If the piping is used to bring about a vacuum in the support material, it must be air- or gas-permeable. In order to be able to further influence the thermal conductivity of the support material, moisture can also be fed in or purged with the permeable pipes.

The expansion of the supply engineering consists of a device installed in the storage tank (water, vacuum) and makes a large volume change possible (flowing in or out), at a pre-determined constant pressure. For the application in the system, a part of the boundary surface of a storage tank (rear wall) is embodied as a membrane, which is anchored by a mechanical power source (a spring element). The storage tank can thus change its volume and this with the aid of the mechanical power source at a constant pre-determined pressure (for instance, depending on the power pattern of the spring). This enables the exchange of a large volume of storage medium (air, gas, liquid) at constant pressure (for filling or emptying) and is used to flush the intermediate space of the construction. In the case of air or a gas being used as the storage medium, vacuum capacity can consequently be disengaged, without a vacuum pump being required. The application thereof is described in more detail in the process section. The efficiency of the device depends directly on the ratio of volumes being exchanged. The characteristics of the mechanical power source (the spring element) can be selected and designed in such a way as to compensate for the pressure gradient of the liquid column in the structure. These pressure-controllable, membrane storage tanks can also be embodied hydraulically or hydropneumatically, and can be connected to one another in parallel or in series.

The expansion of supply engineering consists of a device, which is installed in the intermediate space of the construction and makes it possible for the heat-transport medium (heat-conducting liquid) to be able to flow over the inner surfaces of the shells into the intermediate space. The device comprises, on the one hand, a pipe connection, which covers a certain area of the inner surface, and which uniformly spreads the liquid over the surface. On the other hand, the device comprises a collection vessel, which once again collects the overflowing liquid. The liquid flows from the top downward over the surface.

The expansion of the supply engineering consists of a device for the installation of heat-exchange elements into the intermediate space of the construction, either in the cavity or embedded into the support material. The expansion further comprises devices and connections to couple the heat-exchange elements or the aforementioned supply-engineering expansions to conventional construction-engineering systems such as heat pumps, etc. or to external heating and cooling circulation for machinery and installations.

The concept of heat pipes, which was described under the expansion of the construction, can also be handled under the auspices of supply engineering in the system of dynamic thermal insulation and heat exchange.

The method, which handles the functioning and operation of the system of dynamic thermal insulation and heat exchange, with the aid of the supply engineering, basically executes the following tasks. On the one hand, the intermediate space of the construction is evacuated and a holohedral, continuously variable vacuum is imposed by means of supply-engineering elements and devices. Heat transition through the construction is therewith reduced, and consequently the thermal insulation of the building, structure, or installation increases. The respective construction embodiment and the leak rate that accompanies it define the construction spaces and what vacuum and consequently which minimal heat-transfer numbers and Li-values can be attained with the building envelope. Furthermore, the process brings about ventilation, filling, or pressurization of the intermediate space with air, a mixture of air, or a gas. This can occur by means of expansion of the supply engineering at constant pressure. On the one hand, heat transition through the construction is thereby increased and on the other hand, the intermediate space can either be enriched with moisture or flushed and be freed of moisture. In order to further increase heat transition through the construction, with the aid of elements and devices of the supply engineering, heat-transporting and storage liquid can be directed into the intermediate space of the construction and be filled therewith, which reduces the thermal insulation of the building. These tasks of the process vary the decoupling of the internal climate from the surroundings of the construction. The process is managed by a program which affects the elements and devices of supply engineering. According to established routines, the input signals of the measuring equipment and the sensors are processed by this control program into output signals, which in turn control the components and elements of supply engineering such as valves, pumps, etc.

As already mentioned, management of the process is geared toward and optimized to the respective internal use as well as to the climate zone when planning the building or installation. Furthermore, the management of the process can integrate forecasts and model calculations relating to use and climate, weather, etc. As a result, the individual conditions can be applied together in a more energy-efficient manner.

The method can be described with a base cycle and expansions thereof. The base cycle begins with the evacuation of the intermediate space and the establishment of a vacuum at a specific pre-determined value. The intermediate space is thereupon ventilated with air, an air mixture (containing moisture), or a gas and then filled with a heat-conducting liquid. The process of introduction of and filling with the liquid can be accomplished either with pumps or by suction using a vacuum. In order to once again return to the initial state, the intermediate space is drained of the heat-conducting liquid. Inasmuch as, after draining, residual liquid remains in the intermediate space in the form of drops and accumulations and these vaporize/evaporate with repeated application of a vacuum, a so-called flushing routine must additionally be executed in order to remove this residual moisture, which exerts an undesired influence on the heat-conducting liquid of the construction. In the course of doing this, after draining the liquid from the intermediate space, a vacuum is applied only until the remaining liquid thereby vaporizes/evaporates or at least the vapor pressure thereof is considerably increased, in order to bond the residual liquid in the air. The air or vapor mixture is now exchanged and flushed by means of a pressure-controllable membrane-storage tank (an expansion of the supply engineering) under constant pressure. This process can be repeated until the residual moisture content in the construction has been reduced to a desired, pre-determined value.

It should be pointed out that, as a result, the arrangement of the base cycle and the expansions thereof are directly associated with the pore size of the support material as well as with the geometry and arrangement of the intermediate space of the construction. The process is expanded upon and varied over and above the base cycle so that the system can exploit the general physical and structural construction effects for the heat management of a building. In so doing, the following physical effects and factors are exploited, which arise within the construction as well as their exposure in the surroundings (interior and the environment):

a. Phase shifts, which arise due to the heat capacity and the effective storage mass of the building material inside the construction and the various sectors of the building envelope. These can be tapped, bridged, or reinforced by means of expansion of the construction (pipe laid in the shell of the construction, circulation of the heat-transporting liquid).

b. Different physical conditions (temperature and pressure) and various phases (liquid, gaseous) of the substances in the support material or in the cavity of the construction (air, air mixture, gas, liquid).

c. Phase transitions of substances in the support material or in the cavity of the construction (air, air mixture, gas, liquid). Basically, the phase-transition curve of the substances is run through by the management process, and the resulting amount of heat (latent heat) of the induced liquid-to-gas phase transition is exploited for the heat management of the building. The phase transition is induced either by a temperature or by a pressure difference.

d. The temperature, pressure, and humidity gradients arising in the interior of the construction and the various sectors. This will mainly be possible with the expansion of the construction (division into sectors).

e. The amount of heat arising due to controlled diffusion into and removal of moisture from the construction.

The most important aspects of the process and their expansions, with regard to the various construction embodiments and construction expansions are entered into in the following:

As mentioned, the determination of the process depends on the arrangement of the intermediate space in the construction. Two principal types of construction are possible: an intermediate space with a support material or an intermediate space formed as a cavity. Furthermore, pore size and geometry also play a role in the cavity embodiment. All these aspects have a direct impact on how the management process is set up and consequently on how and what amounts of heat and moisture can be exploited for the heat management of a building or of an installation.

If the intermediate space of the construction is formed with a porous, open-celled support material, the vacuum is formed rather slowly, as is the filling with air, a gas, or the heat-conducting liquid. The limiting factor of the cycle period is the pore size of the support material. This type of construction is suitable if the base cycle of the process is to be carried out rather slowly and likely weather and climate phases are to be utilized (time scale: several days), as well as if heat conductivity is to be specifically minimized.

If the intermediate space of the construction is formed as a cavity, the base cycle of the process can be carried out at shorter intervals (time scale: several hours) and day-phases are likely exploited therewith. The limiting factor of the cycle period in this case is the type and manner whereby the liquid can be completely removed and drained from the intermediate space. It is clear that in the draining process, liquid residue and residual moisture remain in the intermediate space as drops and accumulations in corners and on the spacers, the heat pipes, and the sector dividers. In order to be able to accelerate the draining process, the spacer, heat pipes, and the sector dividers must be embodied in a concave or conical shape, or they must comprise special holes that favor draining. Additionally, the surface tension of the heat-conducting liquid should be reduced by means of specific additives or outside effects which can likewise increase the rate of draining. This type of construction is suitable if the base cycle of the process, as well as the physical conditions, phases, and phase transitions in the intermediate space need to take place at short intervals.

If the intermediate space is embodied with a slotted, notched, porous, or open-celled support material or the like, two or several different physical conditions can be induced in the intermediate space in accordance with the surface treatment of the layer for separating the shells. This is due, on the one hand, to the spatial arrangement and the geometry, as well as, on the other hand, to delays in the establishment of the conditions. This type of construction is suitable for special applications.

The expansion of the process also includes expansion of the construction (orientation-dependent division of the building envelope into sectors) in the management cycle. In this, the base cycle as well as the expansions thereof in the various sectors, operate independently of one another and the amounts of heat resulting therewith are exploited for the heat management of the structure. The corners and passages inside the construction are at the same time evacuated or ventilated to an appropriate extent, but not filled with the heat-conducting liquid. They can be embodied if necessary as a different type of construction.

The expansion of the process also includes expansion of the construction (circulation piping in the shells) in the management cycle. Basically, any amounts of heat can be moved inside the building and, in so doing, transported through heat transition from the shells through the piping to the heat-transporting liquid. On the one hand, the inertia of heat transition due to the heat capacity of the building material can thus be bypassed or accelerated through the construction. On the other hand, in accordance with the number of circulation pipes have been laid out in one structure, various thermal differences and temperature gradients occurring in the shells of the construction can be exploited for the heat management of the building.

If permeable pipe is used, moisture can additionally be supplied to or removed from the building envelope. If this occurs inside the support material, heat transition can be increased therein. If this occurs in the shells of the construction, then the resulting amount of heat (shift in the phase equilibrium) can be tapped and likewise exploited.

The expansion of the process includes expansion of the construction (heat pipes) in the management cycle. As already mentioned, the function of the heat pipes is based on two levels for the heat-conducting liquid in its immediate surroundings in the intermediate space. If the level lies below or outside the heat pipes, heat transition is decoupled by means of the heat-conducting liquid, and no additional heat transition through the construction exists. If the level of the heat-conducting liquid instead lies above or inside the heat pipes, a passive coupling of the heat transition occurs by means of heat transition inside the liquid from one pipe to another and consequently a higher heat transition through the construction. Heat transition can be influenced as desired by the specific arrangement of the heat pipes inside the construction and of the individual sectors and controlled by filling the intermediate space with the heat-conducting liquid. The resultant effects and amounts of heat can be exploited for the heat management of the building. The embodiments for further extension of the concept of heat piping in sectored construction demonstrate how the management process can be expanded around a plurality of possibilities.

Expansion of the process includes expansion of the supply engineering (overflowing of the inner surfaces of the shells by a liquid) in the management cycle. In so doing, the amount of heat at the inside surface of the shells can be tapped without increased heat transition through the construction, transported away, and exploited for the heat management of the building. These heat amounts could also be exchanged by means of circulation piping. It is however additionally possible in the present case, through a targeted management of the vacuum, to exploit the heat resulting from evaporation or condensation on the separation layer in the intermediate space to the shells for the heat management of the building.

Expansion of the process includes expansion of supply engineering (coupling of heat exchange in the intermediate space with WP and construction engineering) in the management cycle. In this case, the process manages coupling to an external heating and cooling system (heat pumps, installations, and machinery). A special liquid can at the same time be exploited either in the pipes of the circulation piping or directly in the intermediate space of the construction, for the exchange of quantities of heat.

The plurality of degrees of freedom in the system, which result due to various types of constructions and supply-engineering components, can be combined as desired with the management process and interconnected with one another, which then results in a single expansion of the process. In addition to the basic cycle and the expansions thereof, various management modes can be defined. These basically consist of a thermal insulation and a heat-exchange mode. In this, the thermal insulation or heat exchange in the building envelope is increased in the individual case through the management process. The goal is the management, and change in the U-value range. Furthermore, a so-called flushing routine is offered which in an active process removes the moisture from the intermediate space. On the one hand, it may involve moisture in the intermediate space of the construction, which arose due to condensation, or it may be due to liquid residue from the heat-conducting liquid that was previously removed from the intermediate space. In this case, the management process exchanges air or a gas in the intermediate space of the construction. For this, pressure-controllable membrane storage tanks (expansion of the supply engineering) are required in connection with specially controlled valves, which can exchange the volume of air or gas under constant pressure conditions.

The heat-conducting liquid, which finds application in the filling of the intermediate space, as well as the heat-transporting liquid, which is used in the circulation piping in the shells of the construction, can consist of the same or different liquids.

The construction, the supply engineering, and the management process form parts of the building as a system. The various expansions of the construction, the supply engineering, and the management process form degrees of flexibility of the system, which can be coupled with one another, can be exploited against one another or combined together with one another. In this way, the system of dynamic thermal insulation and heat exchange by structures and systems can exploit the resultant effects in various ways for heat management.

The system advanced here is optimized with respect to energy engineering before planning by means of a validation and system design. The quantities to be studied are use and climate exposure of the building, on the one hand, with the determination of the conditions and management cycles required, as well as, on the other hand, the U-value range striven for, which, depending on the thermal conductivity of the individual parts of the construction, are defined by the relationship between the pore size of the support material in the intermediate space (up to embodiment as a cavity) and the inside pressure.

BRIEF DESCRIPTION OF THE DRAWINGS

FIG. 14b illustrates schematic representation of a cut-away cross-section of a building envelope FIG. 14c illustrates schematic representation of a cut-away cross-section of a building envelope

MANNER OF EXECUTING THE INVENTION

Figure 1:
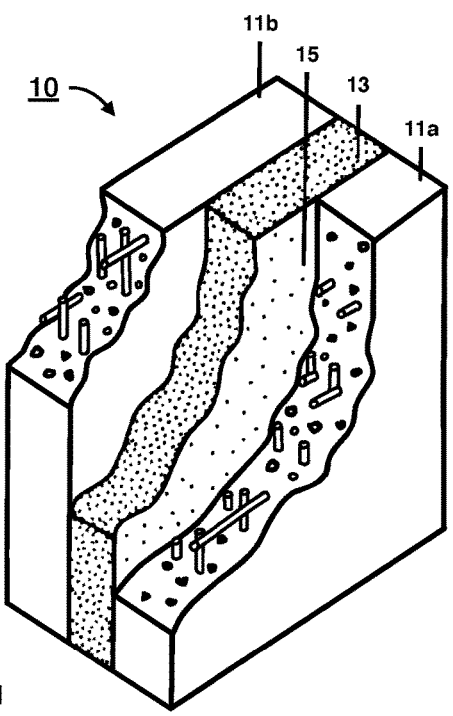
FIG. 1 illustrates a partial-section, perspective depiction of a double-shelled building wall.
Figure 2:
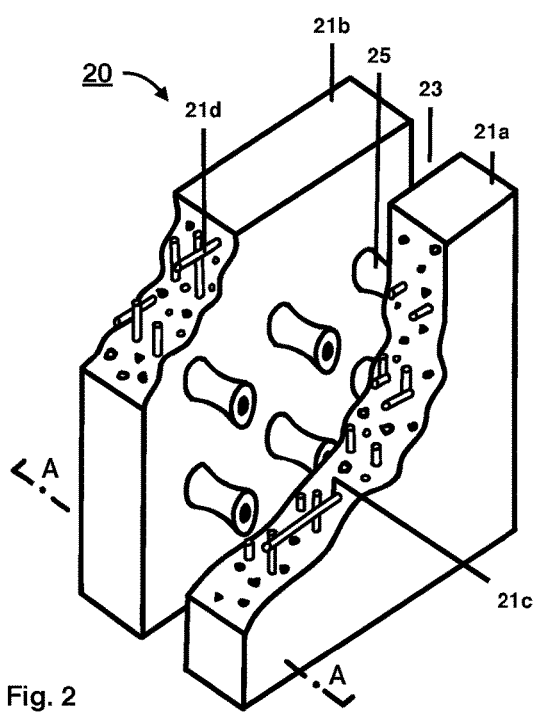
FIG. 2 illustrates a further partial-section, perspective depiction of a double-shelled building wall.
Figure 3:
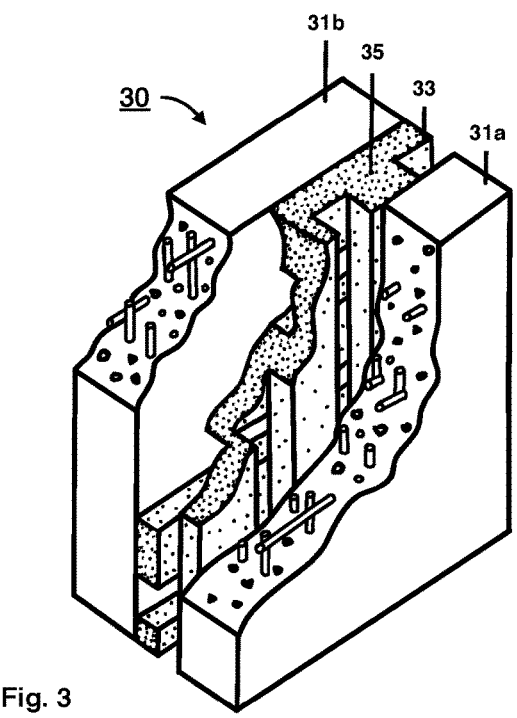
FIG. 3 illustrates a further partial-section, perspective depiction of a double-shelled building wall.

FIGS. 1 through 3 each schematically show in partially sectioned, a cross-sectional representation of a double-shelled building envelope 10, 20, or alternatively 30, which each respectively exhibit a first and a second wall shell 11*a*, 11 *b*; 21*a*, 21*b*, or alternatively 31*a*, 31*b* set at a predetermined distance from one another, which enclose an intermediate space 13, 23, or alternatively 33. In the embodiment of the wall shells depicted, the same respectively exhibit a reinforcement, which is solely separately labeled in FIG. 2 the numbers 21*c* and 21*d*.

With building envelope 10 according to FIG. 1, the intermediate space 13 is filled with a porous, open-celled insulation or support material 15, which can also be introduced in the form of plates and can then contemporaneously have a support function with respect to the wall shells 11*a* and 11*b*. With building wall 20 according to FIG. 2, the intermediate space 23 is essentially empty, aside from a plurality of spacers 25, which hold the wall shells 21*a* and 21*b* at a constant distance from one another. Building wall 30 according to FIG. 3 contains slotted or notched plates 35 in the intermediate space 33 made of porous, open-celled support material.

Figure 4:
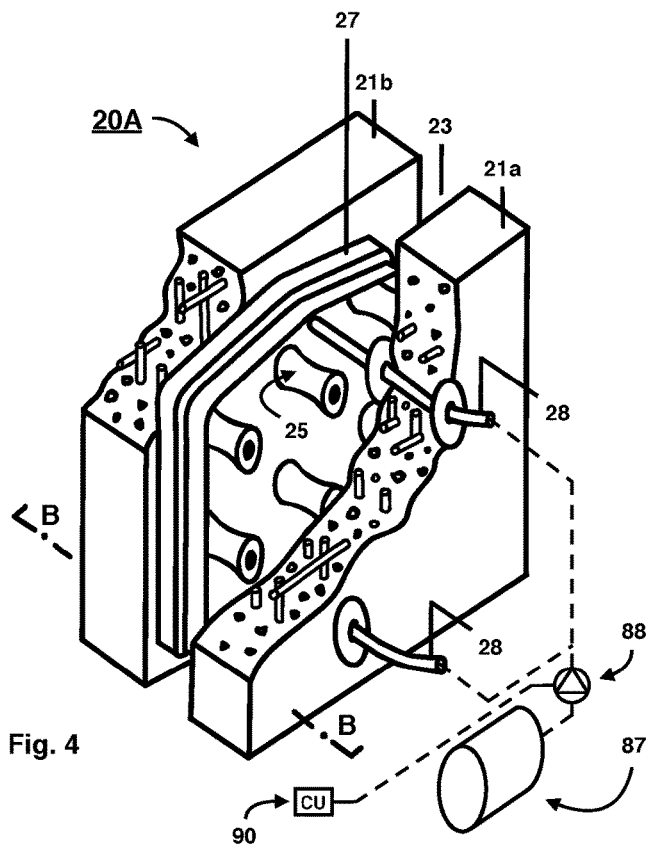
FIG. 4 illustrates a partial-section, perspective depiction of a double-shelled building wall according to one embodiment of the invention.
Figure 5:
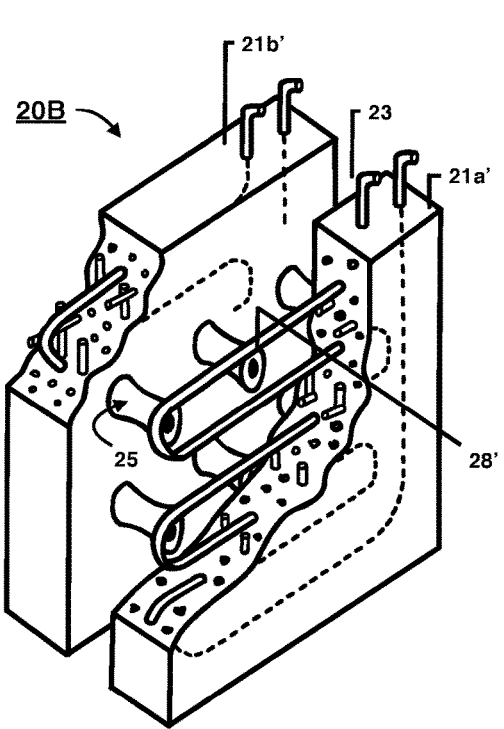
FIG. 5 illustrates a partial-section, perspective depiction of a double-shelled building wall according to one embodiment of the invention.
Figure 6:
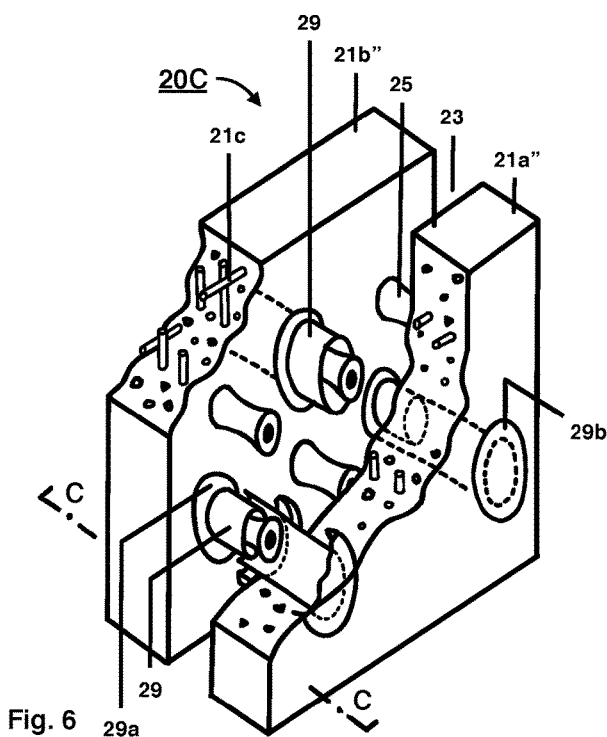
FIG. 6 illustrates a partial-section, perspective depiction of a double-shelled building wall according to one embodiment of the invention.

In FIGS. 4 through 6, schematic embodiment examples of the invention are respectively represented, which stem from the constructions described above according to FIG. 2 and wherein the same elements with the same reference numbers as in FIG. 2 are indicated. In the intermediate space 23 of the construction according to FIG. 4, there are various sections which are separated from one another by fluid-tight separation walls 27, and the individual (which are not separately indicated) sections are provided with separately controllable piping conduits 28 for the input or output of a fluid and for the management of heat transition or heat transport through building envelope 20A in each of the sections. FIG. 5 shows as a further embodiment, a building envelope 20B, in which both wall shells 21*a*' and 21*b*' are modified to be thermally controllable or be usable, for instance as heat collectors, and in which are arranged pipe lengths 28' for the channeling of a heating or cooling liquid. FIG. 6 depicts a building envelope 20*c*, in which are arranged a plurality of heat pipes 29, each with a corresponding spacer element 25 and which are spaced some distance apart from each other, and which run between the two wall shells 21*a*' and 21*b*'' (which have been modified through the addition of means for the affixing of the heat pipes) and with which are respectively associated a sealing and fastening flange 29*a* on the inner-side of the wall and a heat collector element 29*b* on the outside surface of the outer shell 21*a*''.

Figure 7:
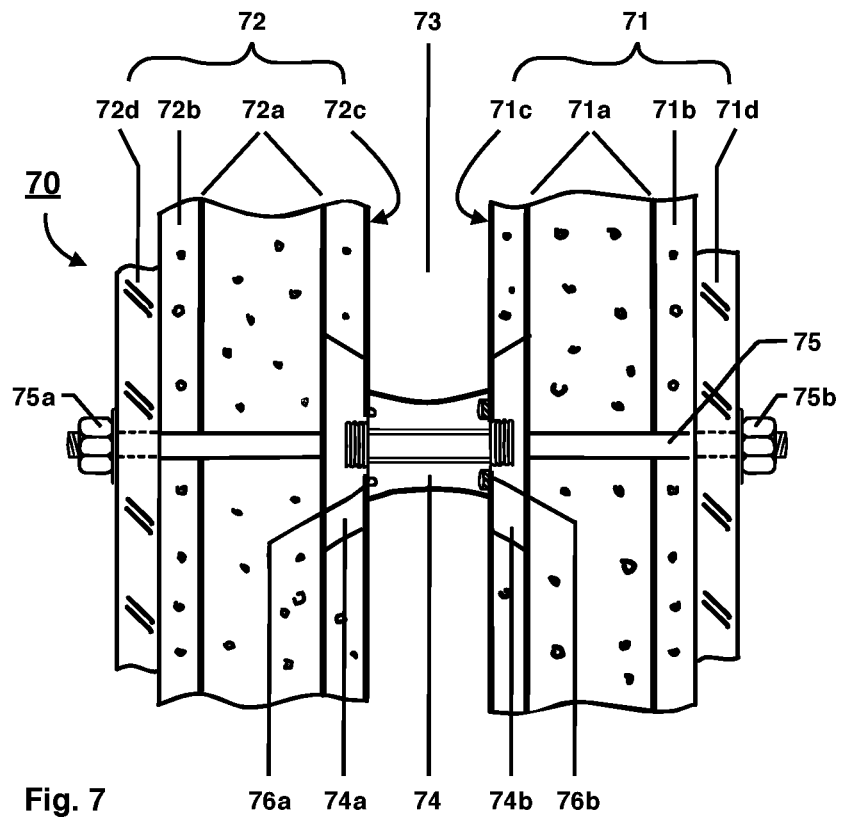
FIG. 7 illustrates schematic, cross-sectional depiction of a building envelope according to a further embodiment of the invention.
Figure 8:
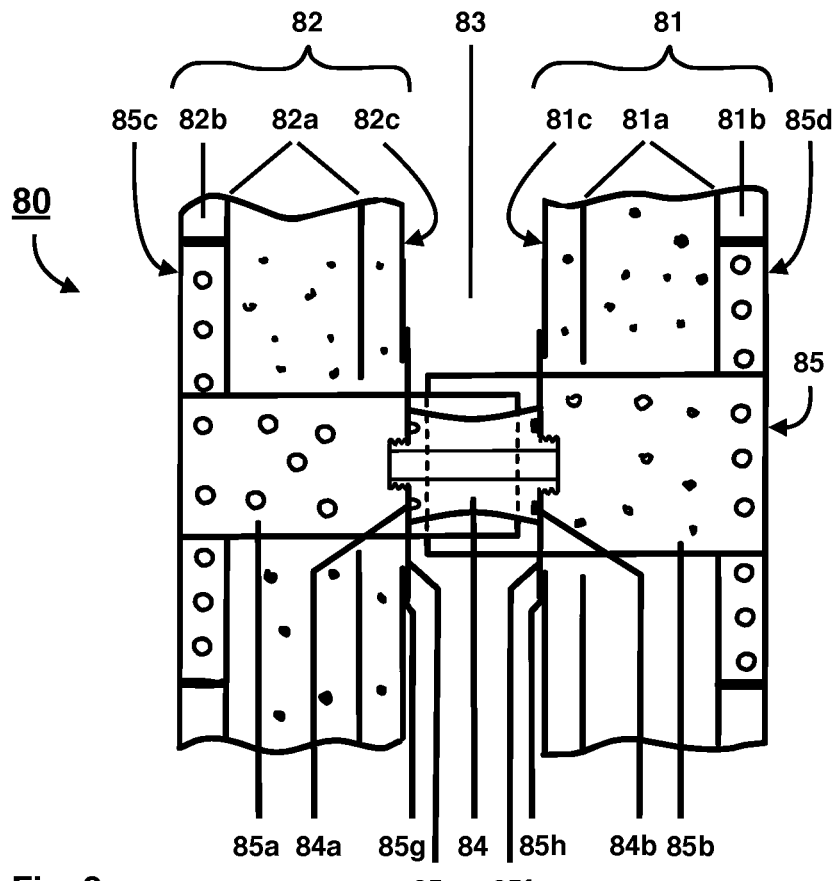
FIG. 8 illustrates a schematic, cross-sectional depiction of a building envelope according to a further embodiment of the invention

FIGS. 7 and 8 respectively show, in contrast to the schematic diagrams according to FIGS. 4 through 6 somewhat more detailed cross-sectional representations of further embodiment examples of the invention.

FIG. 7 shows a cut-away of a building wall 70 of the basic type shown in FIG. 2, which is to say a double-shelled wall construction with spacers. In view of the greater detail of this representation, one has not referred back to the reference numbers of FIG. 2; instead, the two wall shells are respectively indicated by numbers 71 and 72, the essentially empty intermediate space formed between the two shells is given the number 73 and the spacer number 74. Both wall shells 71, 72 respectively comprise a reinforcement 71*a*, 72*a*, in a building material 71*b*, 72*b*, internal coating 71*c*, 72*c*, and finally an outside form or mold 71*d*, 72*d*. In the region of the spacer, anchoring bodies 74*a*, 74*b* are installed to the respective wall cores, and the spacer and the anchoring bodies are penetrated by a form anchor 75, which is fixed on both sides with one each adjusting nut 75*a*, 75*b*. In the region of spacer 74 are represented, on the one side, an ordinary O-ring 76*a*, and on the other side, a sealing element 76*b* which increases volumetrically under external energy influence (heat, radiation, or similar), for the sealing of the intermediate space 73 towards the inside and outside in the area of the penetration through the shells 71, 72 by the form anchor 75.

Function, technical execution possibilities, and advantages of the briefly described preceding building-wall construction are explained further and in more detail above and are the object of the dependent claims and for this reason are not once again described in detail here. As explained above in more detail, in the event of a weakening of, or due to relevant changes in state, of a no longer sufficient sealing action of sealing element 76*b*, this sealing effect can be newly returned to the required size through energy input from the outside.

FIG. 8 shows a further two-shelled building envelope 80. This construction basically resembles that of building wall 20C according to FIG. 6. However here too, there has been no attempt to use the reference numbers appearing in FIG. 6 in the assignment of reference numbers. Here too, two wall shells 81 and 82, which enclose an intermediate space 83, are held at a defined distance by spacer 84. The wall shells 81, 82 further exhibit respectively a reinforcement 81*a*, 82*a* in the building material 81*b*, 82*b* and respectively have a separation coating 81*c*, 82*c* on the inner side. In the area of the spacer, and surrounding it, a heat pipe 85 is provided consisting of a somewhat narrower inner pipe 85*a* and of a, concentric thereto, somewhat broader outer pipe 85*b*. The inner and outer pipes 85*a* and 85*b* of heat pipe 85 respectively pass through the total thickness of the wall shell 82 and 81, in which they are arranged and project overlapping one another into the intermediate space 83.

Each of the pipe sections 85*a*, 85*b* is respectively provided on the exterior wall side of shell 82 and 81 with a heat collector 85*c* or 85*d*. A flange 85*e* or 85*f* is attached for each of the pipe sections 85*a*, 85*b* on the inner side and each sealing and fastening flange is provided with a volume-increasing seal 85*g* or 85*h* of the type and function mentioned in the preceding section, against the adjoining inner wall coating of the respective wall shell. The seals (O-ring or volume-increasing seal) on the spacer already depicted in FIG. 7 are also present in this embodiment; they are here indicated by numbers 84*a* and 84*b*.

Figure 8A:
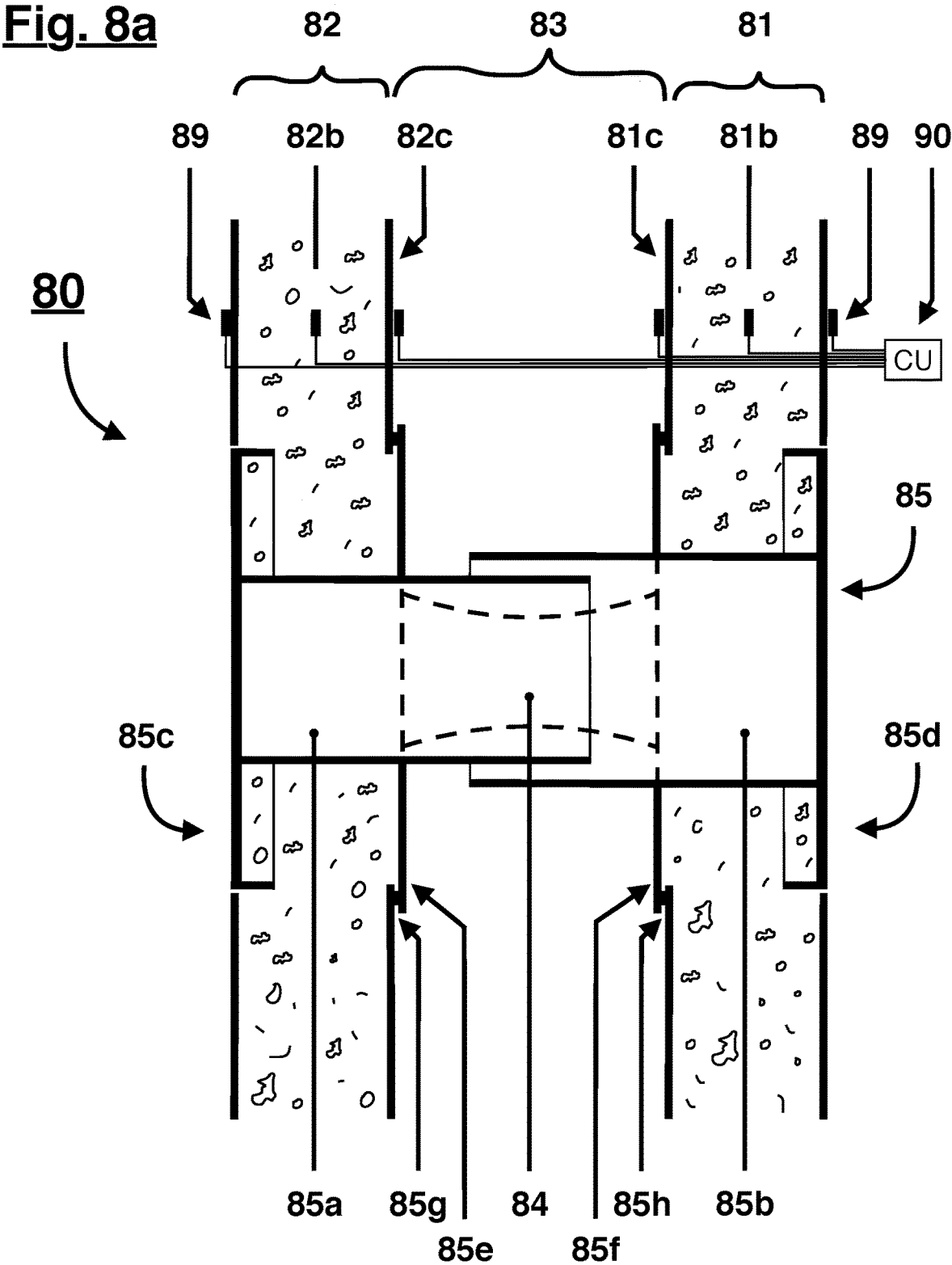
FIG. 8a illustrates a simplified schematic, cross-sectional representation of an embodiment of the invention according to FIG. 8

FIG. 8*a* is a simplified representation of the embodiment according to FIG. 8 for further explanation of the essential features.

Pipe sections 85*a*, 85*b* are pipes arranged concentrically (at a pre-determined distance) and leading into one another. As one can gather from FIG. 8*a*, the pipe sections 85*a* and 85*b* do not contact one another and they only project to a certain point into intermediate space 83. Pipe sections 85*a*, 85*b* can be made out of a good heat-conducting material such as aluminum, copper, or chromium steel. Heat collectors 85*c*, 85*b* (preferably made from heat-conducting sheet metal) are arranged on the outside of the construction and are in direct exchange with the immediate surroundings and can further conduct heat from direct solar radiation to the pipe section connected thereto and projecting into the shells and the intermediate space x82. As long as intermediate space 82 is evacuated, no heat-conducting connection exists between the pipe sections 85*a* and 85*b*. If intermediate space 83 were to be filled with a heat-conducting liquid, an increased heat transition from a pipe section 85*a* to the other pipe section 85*b* would thereby occur. A passive heat bridge is thereby formed inside the construction and heat transition increases (considerably). As a whole, the heat pipe 85 bridges the intermediate space 83 between wall shells 81, 82 and in particular the separation layers 81 and coatings 81c, 82c. If the heat-conducting liquid were to be drained from the intermediate space 83, then the additional heat transition within the construction is cancelled. Inasmuch as the pipe sections 85a, 85b do not contact one another, a heat bridge is no longer present inside the construction (in the case of a drained intermediate space 83).

The function of pipe sections 85a, 85b therefore depends on two levels of a thermal liquid in the intermediate space 83. If the level is below pipe sections 85a, 85b (or heat pipe 85), no increased heat conduction exists. If the level is above heat pipe 85, increased heat conduction occurs.

Spacer 84 can be embodied in conjunction with heat pipe 85.

Figure 8B:
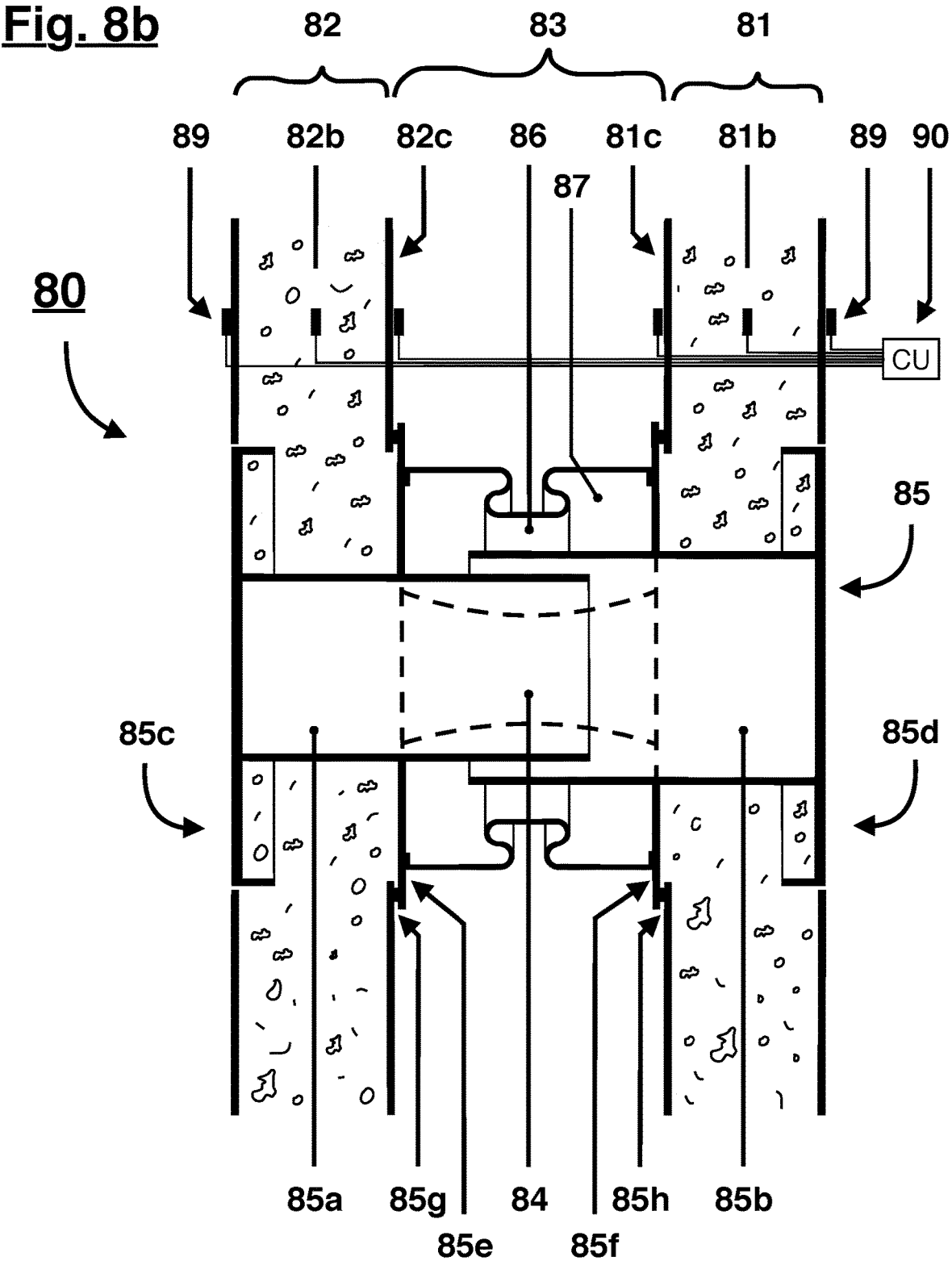
FIG. 8b illustrates a schematic, cross-sectional representation of a building envelope according to a further embodiment of the invention

FIG. 8b shows an alternative embodiment of a building envelope. The embodiment according to FIG. 8b is basically laid out like the embodiment according to FIG. 8a. Additionally, a separation wall 86 is provided around pipe sections 85a, 85b. The separation wall 86 is, in this specific case, a cylinder formed around heat pipe 85 (other constructions are possible). The separation wall 86 is fastened to the sealing and fastening flanges 85e, 85f and is sealed by the same. The (cylindrical) separation wall 86 defines a liquid reservoir 87, into which heating liquid can be introduced (and subsequently drained from). The cross-section of separation wall 86 is double-S-shaped. In this specific embodiment example, separation wall 86 can exhibit a central segment which is inwardly displaced in a radial fashion when compared to the edge sections.

Figure 8C:
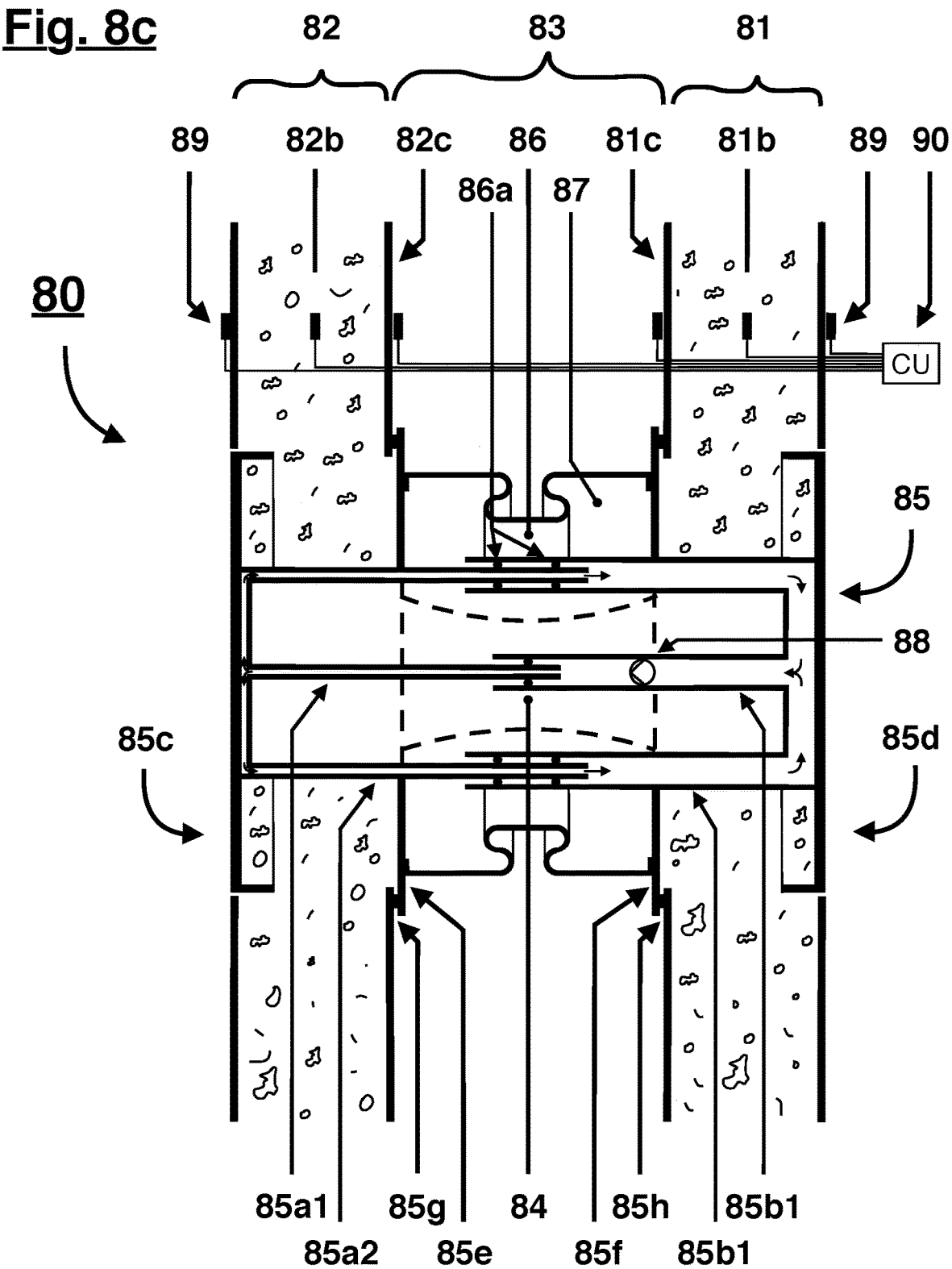
FIG. 8c illustrates a schematic, cross-sectional representation of a building envelope according to a further embodiment of the invention

FIG. 8c shows a further embodiment of a building envelope. This embodiment basically exhibits the construction of the embodiment according to FIG. 8b, in particular with regards to the separation wall 86. Heat pipe 85 is, however, formed differently from the embodiment according to FIG. 8b. In the embodiment according to FIG. 8c, pipe section 85a includes a pipe-section segment 85a1 and a pipe-section segment 85a2 that is arranged (concentrically) around pipe-section segment 85a1. The pipe-section segments 85a1, 85a2 project respectively into intermediate space 83 and are (partially) arranged inside pipe-section segments 85b1, 85b2 of the second pipe section 85b. A distance between the pipe-section segment 85a1 and 85b1 as well as between 85a2 and 85b2 is sealed by gaskets 86a so that pipe sections 85a, 85b are joined in a fluid-tight manner to one another. A liquid pump 88 is provided in pipe-section segment 85b2, which achieves liquid circulation in the direction of the arrows in FIG. 8c.

The embodiments according to FIGS. 8a, 8b make use of passive heat conduction. The embodiment according to FIG. 8b is particularly advantageous if intermediate space 83 is evacuated or is filled up with a porous, open-celled insulation/support material.

The embodiment according to FIG. 8c operates with active heat conduction. In this embodiment, liquid is transported inside heat pipe 85 from the heat collector 85c by means of the double-walled embodiment of heat pipe 85 through the construction to heat collector 85d (and by means of pipe-section segments 85b1 and 85a1 in the reverse direction).

Figure 9:
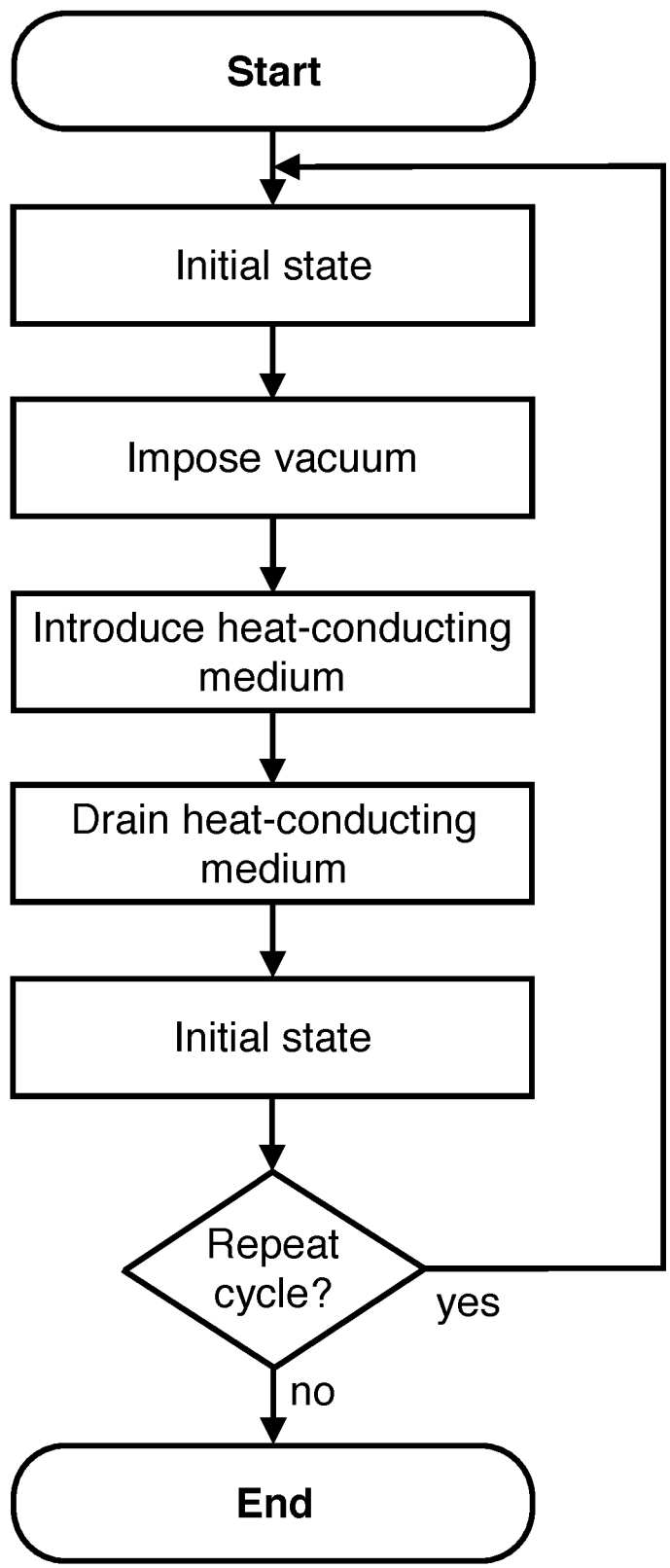
FIGS. 9 through 11 illustrate schematic representations to illustrate embodiments according to the invention process.

FIG. 9 schematically shows in a type of simple flow diagram an operational sequence for achieving an applied or increased heat exchange through a building envelope of the type described above as an embodiment example of the process according to the invention.

The intermediate space of the construction has a specified configuration (porous, open-celled support material—cavity) and a specified geometry, which is given by the climate zone and use. It is divided into individual sectors. The "Initial state" stage equalizes the physical conditions in the intermediate space with either the outside environment or the interior. This can also be indicated as "Airing". The initial state can also be fitted into the process sequence in order to prepare the intermediate space for the subsequent processes.

The step "Impose vacuum" reduces the pressure in the intermediate space to a pre-determined value by means of a vacuum pump or by pressure compensation with a storage- or pressure-controllable membrane storage tank. Depending on the moisture content of the air or gas contained therein, the liquid-gas-liquid phase transition can be induced by means of the step "Impose vacuum". The step "Introduce heat-conducting medium" fills the intermediate space with the heat-conducting medium by means of pumps, by pressure compensation with a storage- or pressure-controllable membrane storage tank or by the "Suction" step using the vacuum. This can be air with a pre-determined moisture content, a gas, or a liquid.

The step "Drain heat-conducting medium" drains the intermediate space of the heat-conducting medium by means of pumps, by pressure compensation with a storage- or pressure-controllable membrane storage tank or by suction by means of a further "Impose vacuum" step. In the latter case, a step for airing the building envelope follows. Subsequently, there is a decision step "Repeat cycle?" during which it is decided whether and, where necessary, at which point in time the cycle should be repeated and is based upon, on the one hand, the heat exchange achieved with a condition of the building envelope being filled with a heat-conducting medium, and, on the other hand, the existing target values and for example, additional recorded parameters. If there is no necessity for the same, the run is concluded; otherwise one returns to the "Impose vacuum" step.

Figure 10:
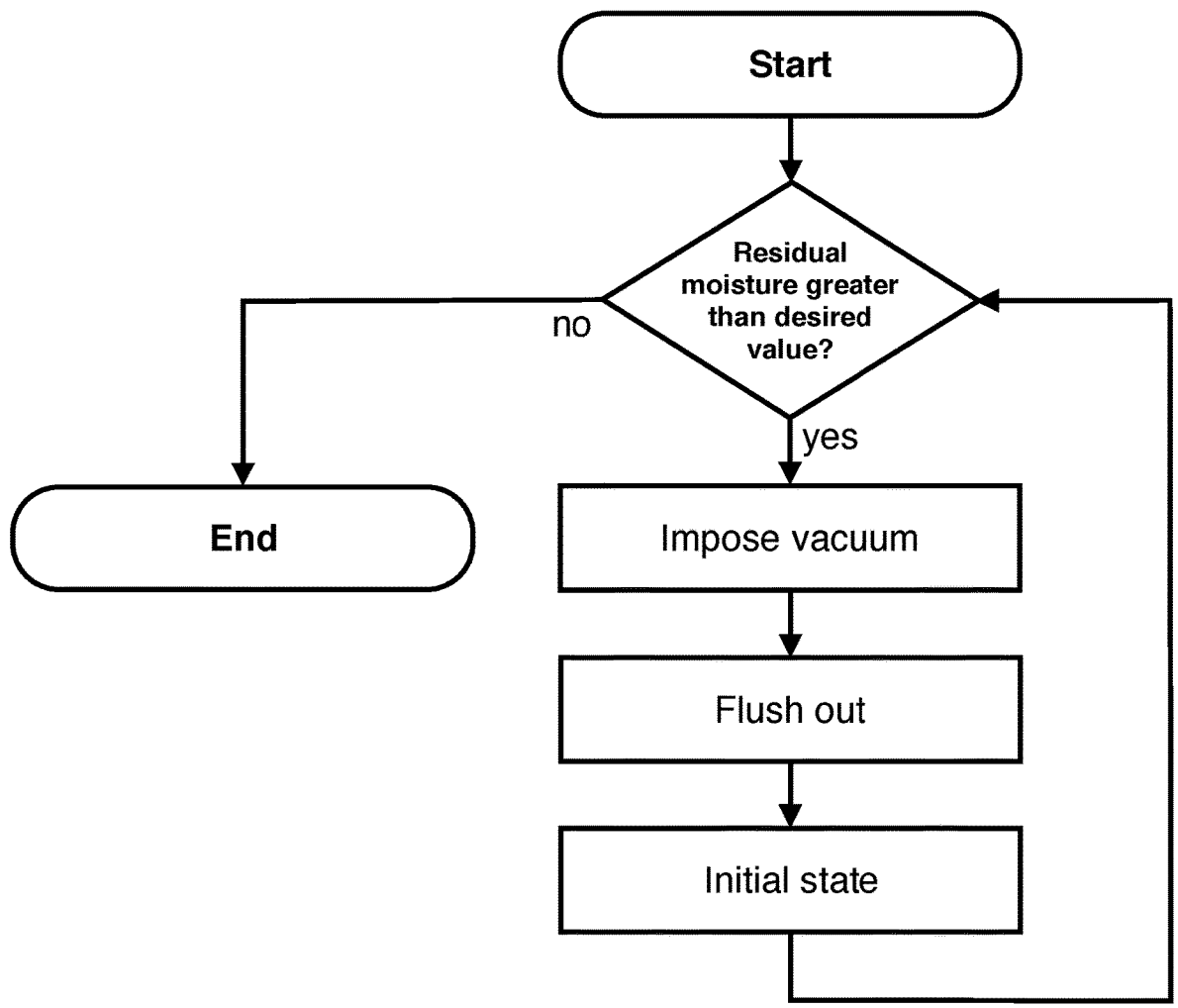

FIG. 10 shows in an analogous manner, the run of a flushing routine, with which the intermediate space of the building envelope is cleared of moisture or residual gas from a preceding process run at constant pressure, and which can be fitted in at various suitable points in the process runs.

The run begins with a step of determining the residual moisture in the intermediate space and comparison with a nominal value, as a result of which it is decided whether a flushing routine is to be performed. Were this to be the case, an "Impose vacuum" step follows (as described in the preceding process). The "Flush out" step exchanges the air, gas, or liquid volume in the intermediate space under pre-determined, constant-pressure conditions. This is performed, for example, with the aid of a previously evacuated membrane storage tank or one prepared at a specified pressure ratio, which exchanges the volume in the intermediate space once, twice, or several times under constant pressure. In so doing, a pressure difference is produced between the conditions of the surroundings, the membrane storage tank, and the intermediate space. A vacuum pump can additionally provide the required air or gas volumes. With this step, an initial state is reached, in which the measurement and comparison steps which were initially performed are performed once again. If required, the cycle is then run through once again.

Figure 11:
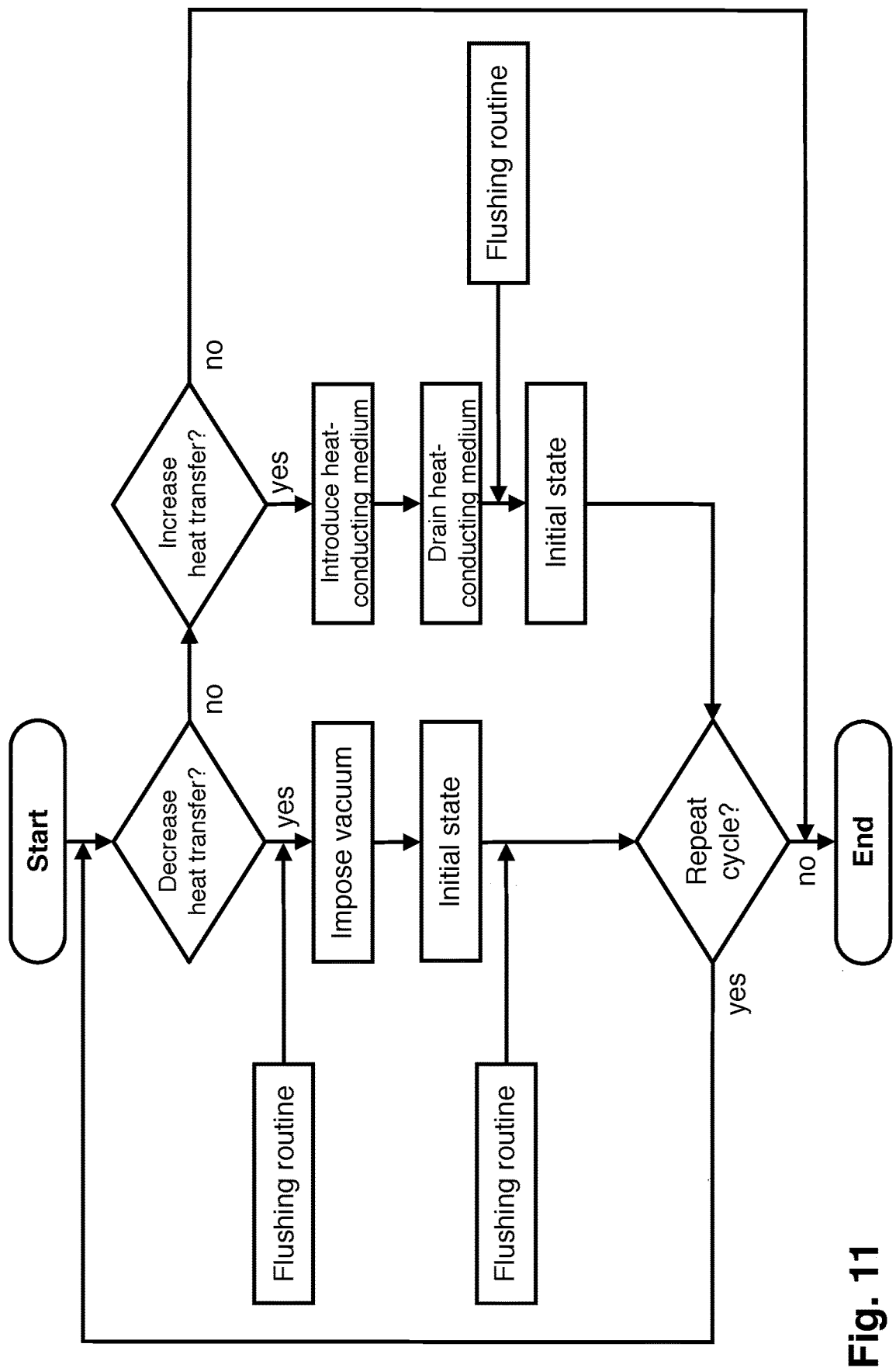

FIG. 11 shows, in contrast to that in FIG. 9, a rather more complex process run, in which at the beginning a decision for one of the available options "Reduce heat transition?" or "Increase heat transition?" is made. The two subsequent subroutines, which depend on the decision made, are represented here in a rather simplified manner, and the representation is essentially self-explanatory based on the labels. In the figure, it is also noted that, at specified sites, an appropriate flushing routine of the type outlined in FIG. 10 can be fitted in.

The representations in the flow diagrams are highly simplified and do not mirror the runs that in practice are considerably more complex, which can be produced under the influence of various measurement and comparison steps and which can be governed by intermediate decisions or due to partial pressure decreases or increases. Such elaborations do however lie within the purview of a person skilled in the art and need no more detailed description here.

Figure 12:
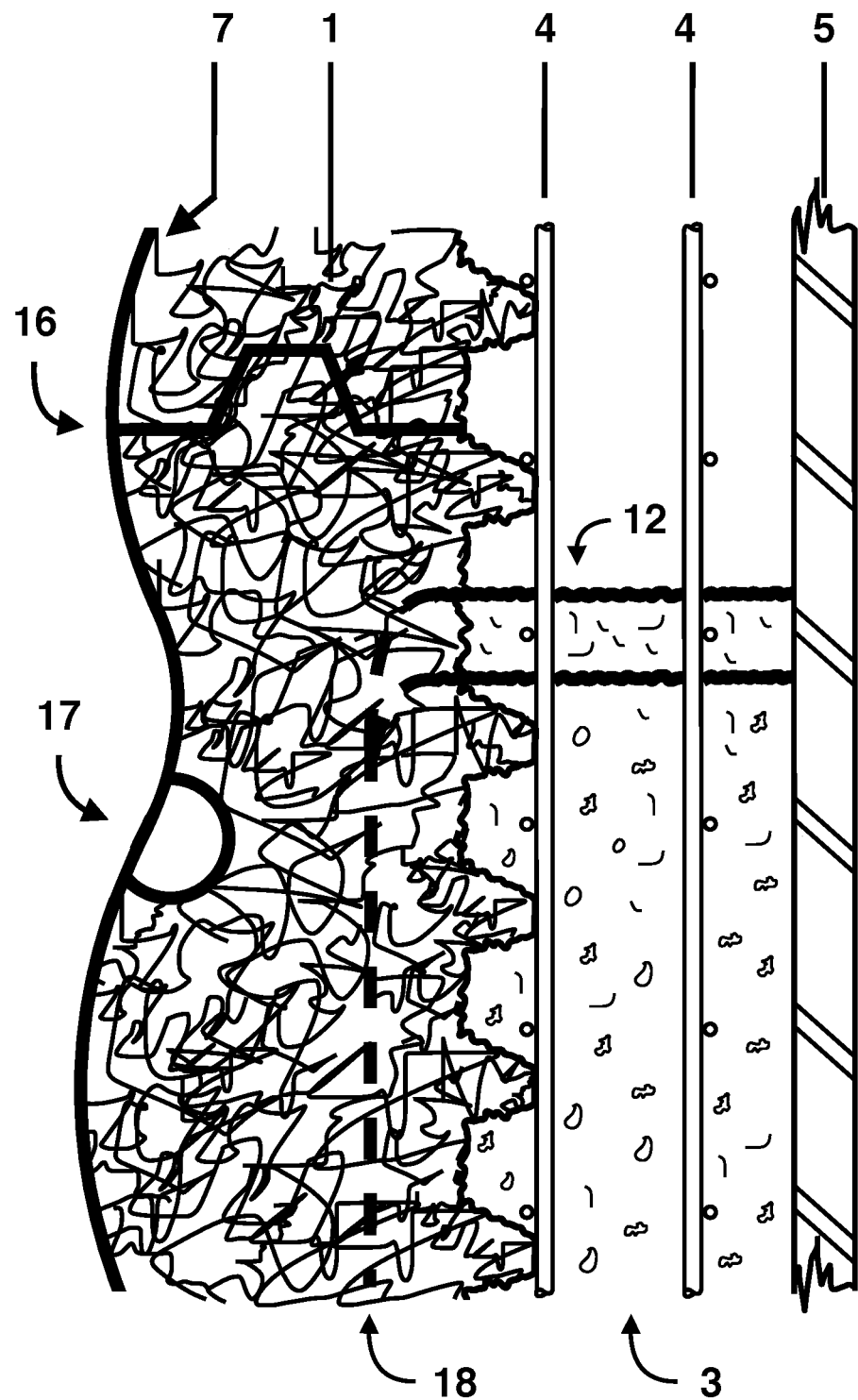
FIG. 12 illustrates a schematic cut-away of a cross-section of a building envelope during manufacture
Figure 13:
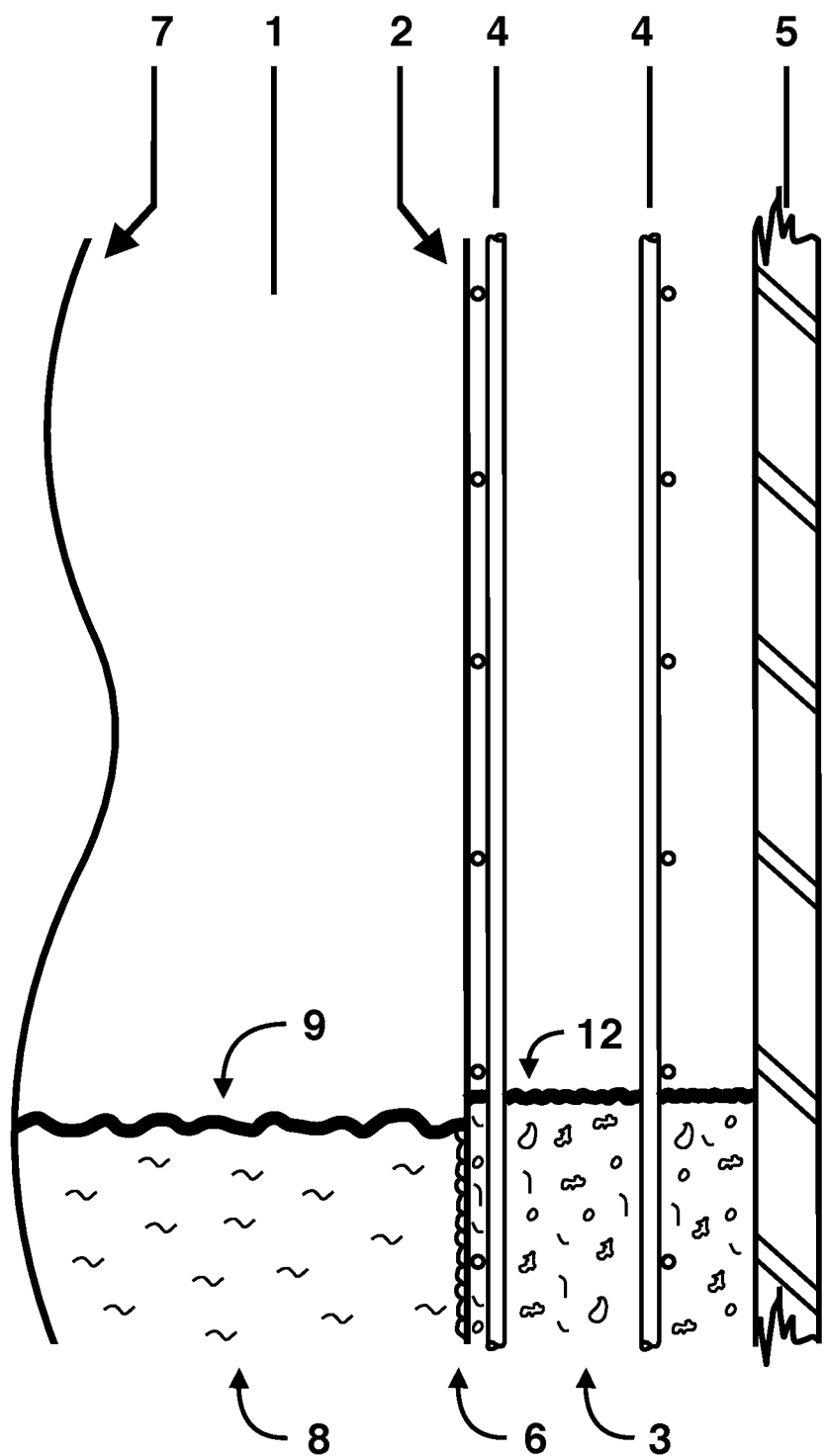
FIG. 13 illustrates a schematic cut-away of a cross-section of the building envelope in an alternative manufacture

FIGS. 12 and 13 show segments of a cross-section of a building wall during manufacture. In FIG. 12, an intermediate space 1 is filled up with a porous, open-celled insulation/support material 15. An additive 12 serves to form a separation layer. The additive 12 exhibits a density hat is lesser than that of the building material 3 (concrete, for example) and cures comparatively quickly. Due to its lower density, the additive 12 remains above the building material 3. The additive 12 penetrates the armoring 4, so that a separation layer 18 is formed in intermediate space 1. A form or mold is identified by reference number 5. The insulation/support material can comprise several plates, which are arranged above a joint 16 and next to one another. Optionally, an air conduit 17 can be provided (as a recess in the insulation/support material). The separation layer 18 forms a sealing surface between the insulation/support material executed in the intermediate space 1 of a double-shelled construction and the building material 3.

In FIG. 13, the intermediate space 1 is formed as a cavity. A fine-mesh non-woven material 2 fits tightly on the reinforcement lattice 4. If the building material 3 (in its flowable phase) comes into contact with a support liquid or a granulate (displaced with a bond-accelerating additive 8), it hardens comparatively quickly. The liquid 8 is introduced during manufacture at the same rate as that of the flowable building material 3, so that a liquid level 9 of the support liquid or alternatively of the granulate 8 is a little below the level 10 of the building material 3. Cured building material which has penetrated the non-woven material 2 is identified by reference number 6. Reference number 7 identifies a mirror plane of the illustration according to FIG. 13. A form or mold is identified by reference number 5.

Figure 14A:
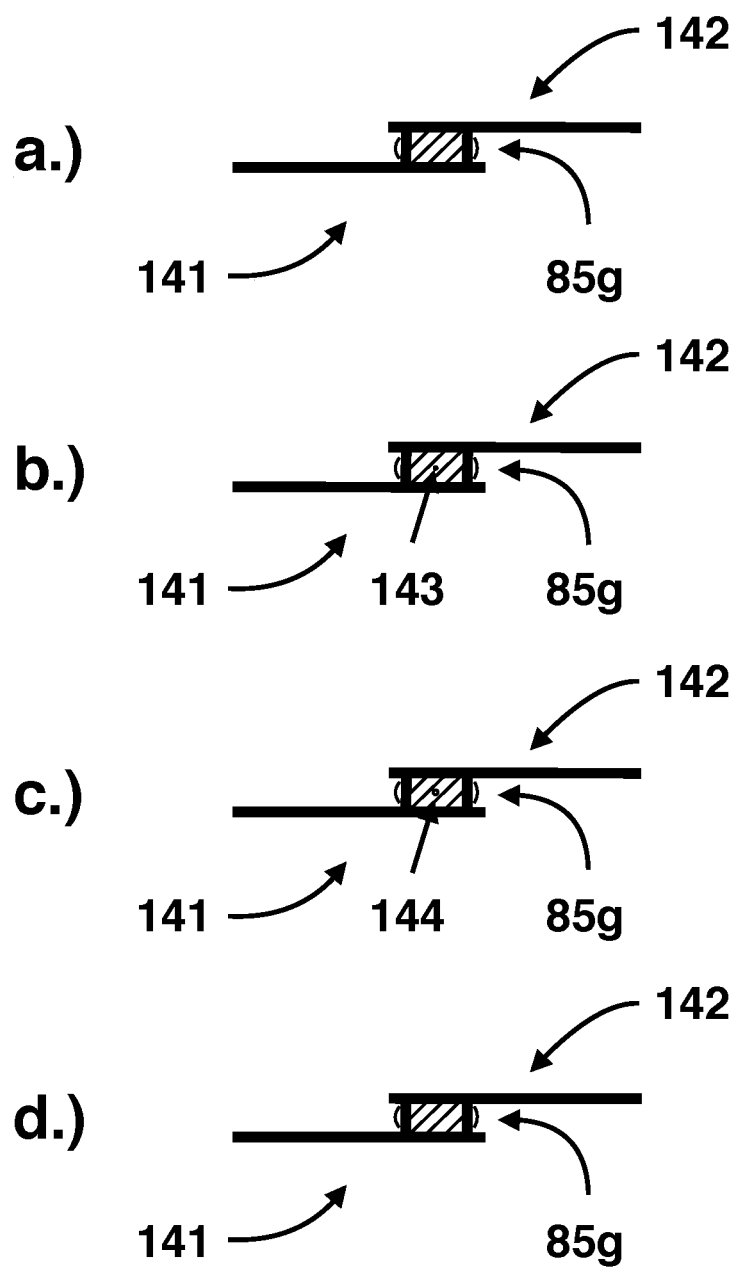
FIG. 14a illustrates a various schematic representations of seals
Figure 15A:
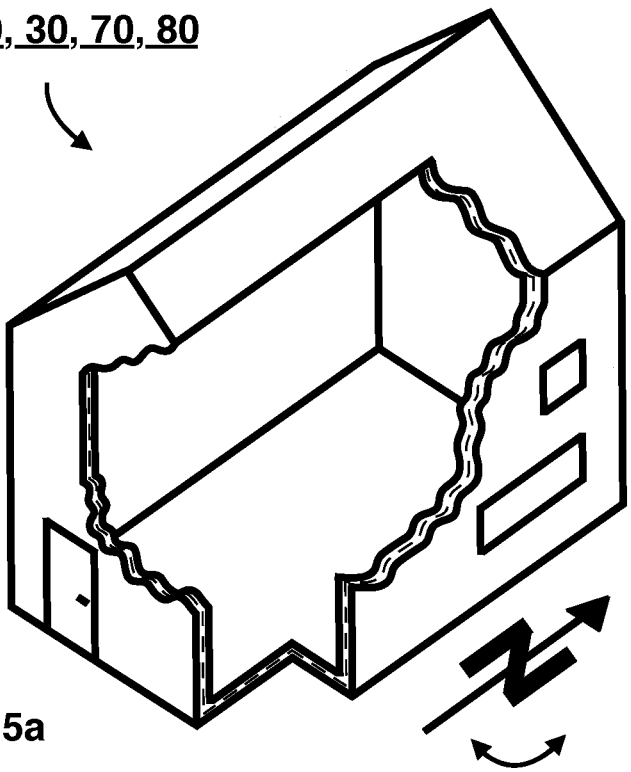
FIG. 15a illustrates an exemplary fixed foundation
Figure 15B:
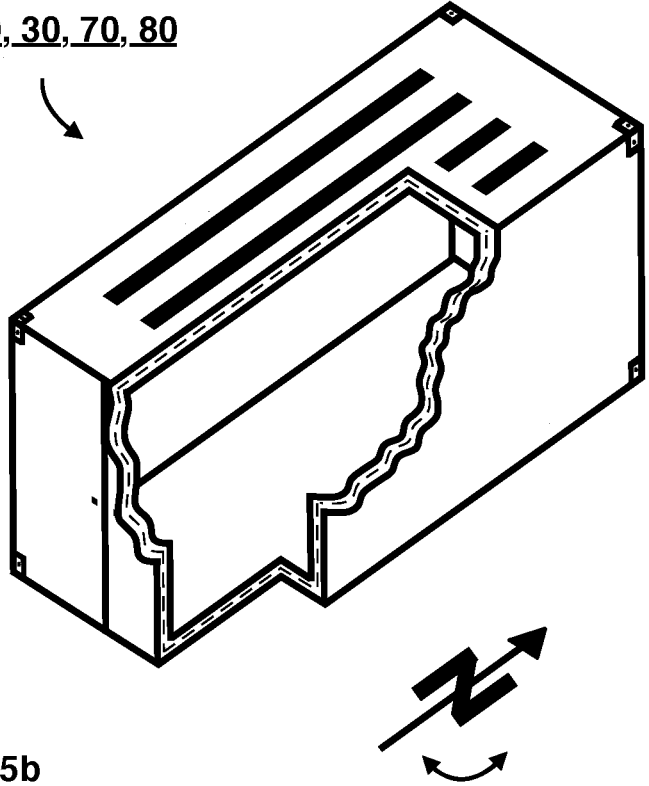
FIG. 15b illustrates an exemplary mobile foundation with a building envelope.
Figure 16:
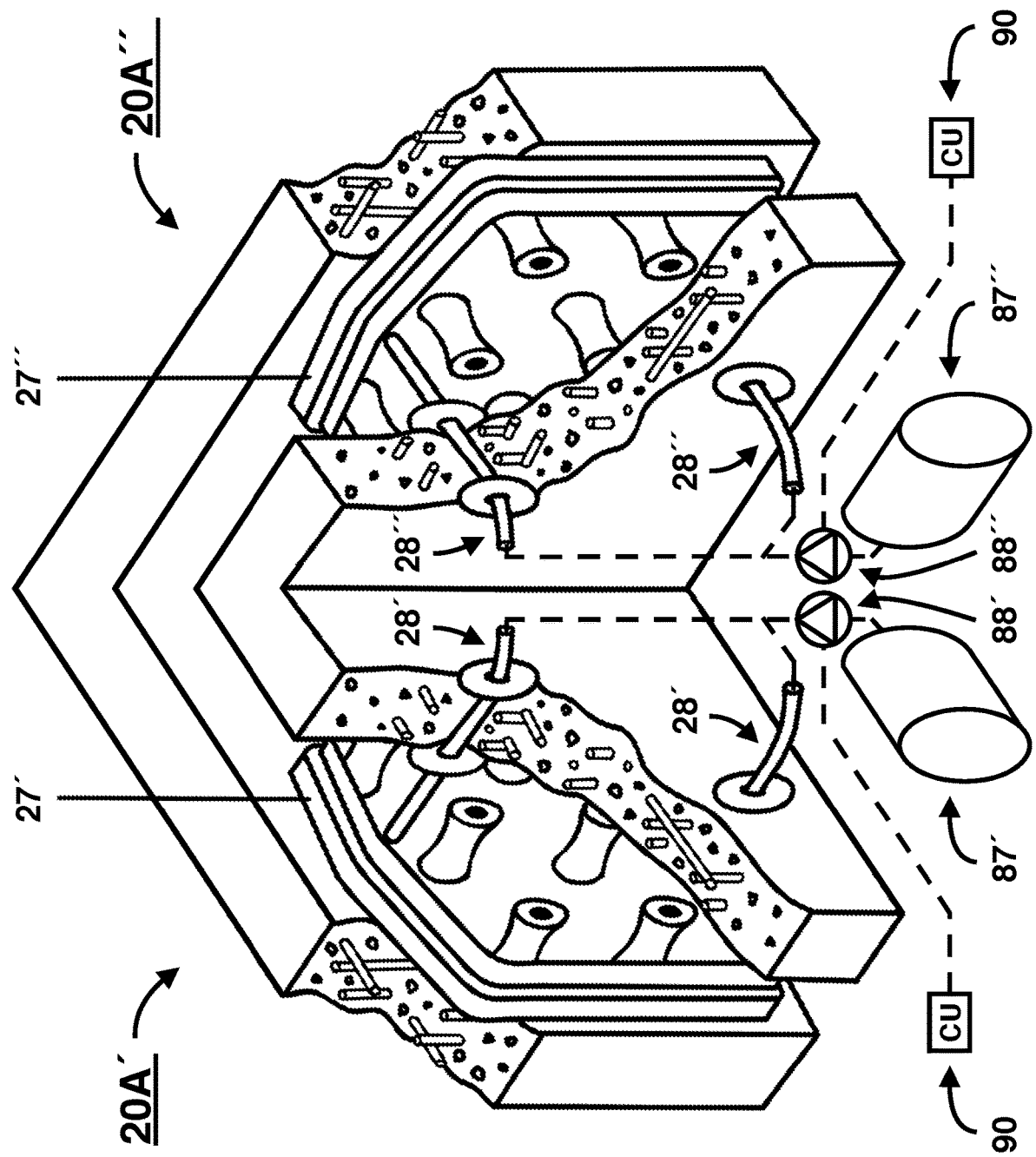
FIG. 16 illustrates controlling fluid supply and removal in response to acquired and/or input values of a state variable

FIG. 14a shows various schematic cross-sections of the seals, whose volumes can be changed. The schematic representation under (a) in FIG. 14a shows a seal 85g, whose volume can be increased due to heat action through heat-conducting plates 141, 142. The heat-conducting plate 141 is, for instance, heat-conducting plate that is connected to the outside. Heat-conducting plate 142 is, for example, a heat-conducting plate that is provided for the division of sectors on the inside of the construction. In accordance with the embodiment according to (b) in FIG. 14a, the volume of the seal 85g is increased by heating action, which results from heating up an electrical cable 143 on the inside of the seal 85g. Under (c) in FIG. 14a, the seal 85g is enlarged by the action of a chemical, which is contained inside a (permeable) pipe 144. The pipe 144 is provided inside the seal 85g. Under (d) in FIG. 14a, the sealing material is enlarged by the action of electromagnetic radiation (at a pre-determined wavelength).

FIG. 14b shows a cut-away cross-section of a building envelope with a plurality of seals 85g. As can be gathered from FIG. 14b, the heat-conducting plates 141, 142 are sealed against one another by means of a seal 85g. Further seals 85g are provided between the sealing flange 85e and the reinforcement 82a. Still further seals 85g are arranged on the heat collector 85c as well as on the heat-conducting plate 141.

FIG. 14c shows a cut-away cross-section of a building wall with a seal 85g (by way of example, for the division of sectors) in a case in which the intermediate space 83 is filled with a porous, open-celled, insulation/support material.

The execution of the invention is not limited to the examples and aspects explained above, instead a plurality of modifications are also possible, which are within the purview of matters known to a person skilled in the art.

REFERENCE LIST

2 Non-woven material
5 Form or mold
6 Cured building material
7 mirror planes
8 Support liquid or granulate
9, 12 Liquid level
10, 10', 10", 20, 20', 20", 20A, 20A', 20A", 20B, 20C, 30, 70, 80 Building envelope or alternatively wall
11a, 11b; 21a, 21b; 21a', 21b'; 21a", 21b"; 31a, 31b; 71, 72; 81, 82 Wall shell
1, 13, 23, 33, 73, 83 Intermediate space
15 Porous, open-celled material
16 Plate joint
17 Air conduit
4; 21c, 21d; 71a, 72a, 81a, 82a Reinforcement
25, 74, 84 Spacer
27, 27', 27" Separation wall
28, 28', 28" Pipe conduit
29, 85 Heat pipe
29a; 85e, 85f Sealing and fastening flange
29b; 85c, 85d Heat collector element
35 Slotted or notched plates
3, 71b, 72b, 81b, 82b Building material
18, 71c, 72c, 81c, 82c Inside and separation coating
71d, 72d Mold
74a, 74b Anchoring body
75 Bolt
75a, 75b Adjusting nuts
76a, 76b; 84a, 84b, 85g, 85h O-ring, gasket
85a, 85a1, 85a2 Inside pipe (heat pipe)
85b, 85b1, 85b2 Outside pipe (heat pipe)
86 Separation wall (cylinder)
86a Gasket
87, 87', 87" Liquid reservoir
88, 88', 88" Liquid pump
89 Sensor and/or input means
90 Control unit (CU)
141, 142 Heat conducting plates
143 Electrical cable
144 Pipe (permeable)

The invention claimed is:

1. A building envelope for a building wall, floor, or roof of a building, the building envelope comprising:
at least two shells spaced apart from one another which enclose a single intermediate space, the at least two shells including an exterior-facing shell configured to face an exterior of the building, and an interior-facing shell configured to face an interior of the building;
a plurality of first pipes connected with the exterior-facing shell and including a heat-collector element on an exterior-facing side of the exterior-facing shell, the plurality of first pipes protruding through the exterior-facing shell and ending in the single intermediate space without contacting an exterior-facing side of the interior-facing shell, the single intermediate space being sealed against the interior and the exterior of the building and being filled with structural weight-bearing and building-technology components, and at least in sections with a porous, open-celled 3D-pattern material including at least one pore, wherein at least one of a shape and a size of the at least one pore is configured based on at least one of utilization and exposure of the building, and wherein the plurality of first pipes is configured to at least one of increasing, holding or decreasing heat transition through the building envelope by induced bridging of thermal properties of the exterior-facing shell, a plurality of second pipes arranged in the single intermediate space and connected with the interior-facing shell, without contacting the interior-facing side of the exterior-facing shell, wherein:

(a) each of the second pipes is arranged concentrically inside an associated first pipe without contacting the associated first pipe, or each of the first pipes is arranged concentrically inside an associated second pipe without contacting the associated second pipe, and/or (b) the first and second pipes associated with one another are concentric and spaced apart without contacting each other, and/or (c) a space for joining remains available between the first and second pipes associated with one another the space being configured such that a fluid at least one of increasing, holding or decreasing heat transition or affecting heat transport can penetrate through the space for joining between the first and second pipes associated with one another.

2. The building envelope according to claim 1, comprising:

the plurality of second pipes connected with the interior-facing shell and including a heat-collector element on an interior-facing side of the interior-facing shell, the plurality of second pipes protruding through the interior-facing shell and ending in the single intermediate space without contacting the interior-facing side of the exterior facing shell, the plurality of second pipes ending in the single intermediate space, in such a manner that each first pipe together with an associated second pipe form a heat pipe, wherein:

the space for joining includes sealing means such that the heat pipe that is constituted by the associated first and second pipes enables a transport of a fluid, and wherein:

(a) the heat pipe is configured to at least one of increase, hold or decrease heat transition through the building envelope by induced bridging of thermal properties of the exterior-facing shell and/or thermal properties of the interior-facing shell and/or thermal properties of the single intermediate space, and/or (b) the heat pipe is configured to affect heat transport through the building envelope by movable heat capacities within and/or across the exterior-facing shell and/or the interior-facing shell and/or the single intermediate space.

3. The building envelope according to claim 2, wherein the heat pipe provides for an interactive fluid circulation between the exterior-facing and the interior-facing shells, wherein the heat pipe includes a central pipe section for forwarding of a circulating fluid and is located inside a double-walled second pipe section for return of a circulating fluid.

4. The building envelope according to claim 2, wherein at least one part of the pipes, and/or or the heat pipe, and/or one of the heat-collector elements, comprise:

means for enlarging the surface area using one or more heat-conducting plates, ribs, or a corrugated structure.

5. The building envelope according to claim 2, comprising:

controllable sealing means configured for controlled sealing of the single intermediate space from both the interior and the exterior of the building and/or of a discrete building-envelope section of the building, wherein the controllable sealing means are configured to change their volumes and/or their shape under an effect of heat, electromagnetic radiation, chemicals or mechanical forces in a controlled manner.

6. The building envelope according to claim 2, comprising: means for fluid supply and removal for controlled supply and removal of a fluid for at least one of increasing, holding or decreasing heat transition through the building envelope or affecting heat transport into or out of the building envelope, and/or into or out of the single intermediate space and/or into or out of at least one of the at least two shells, wherein:

the single intermediate space and/or at least one of the at least two shells is divided into building-envelope sections, to which are separately attached controllable means for fluid supply and removal for section-selective management of a respective heat transition and where the building-envelope sections are separated from one another in fluid-tight manner and/or the separately controllable means for fluid supply and removal are configured for section-selective control of heat transport; and:

(i) sensor and/or input means for acquisition and/or inputting of section-specific values of a thermal state variable, including at least one of a measured or estimated outdoor temperature, sunlight intensity, a moisture content, or desired indoor temperature in each of respective building-envelope sections, are associated with the separate building-envelope sections which are connected on the input side with control means for the means for fluid supply and removal; and/or (ii) the means for fluid supply and removal include gas or air pumps for generation of selected negative pressure, positive pressure, or normal pressure in the single intermediate space of each of the respective building-envelope section, and are configured to optionally include a gas or air reservoir; and/or (iii) the means for fluid supply and removal are connected to first pipes on the exterior-facing shell and/or to second pipes on the interior-facing shell and/or to heat pipes formed by associated first and second pipes.

7. The building envelope according to claim 6, wherein the means for fluid supply and removal comprise:

liquid pumps and a liquid reservoir for filling of the single intermediate space of the respective building-envelope section with a fluid for at least one of increasing, holding or decreasing heat transition or affecting heat transport or the draining thereof.

8. The building envelope according to claim 6, comprising:

a conduit system in the single intermediate space and/or in at least one of the at least two shells configured to pass a fluid for at least one of increasing, holding or decreasing heat transition or affecting heat transport, which is sized to be section-specific and/or includes section-specific means of flow-control for flow control of the fluid for at least one of increasing, holding or decreasing heat transition or affecting heat transport.

9. The building envelope according to claim 8, wherein the means for fluid supply and removal comprise:
fluid-permeable conduit sections, which are configured for passage of fluid through a conduit wall for at least one of increasing, holding or decreasing heat transition or affecting heat transport.

10. The building envelope according to claim 6, wherein different walls, floor, or roof sections and/or walls, roofs or floors of spaces with different functions, which are associated with different cardinal directions, constitute building-envelope sections.

11. The building envelope according to claim 6, wherein the at least two shells are supported against one another by a plurality of individual spacers, configured to be washed around by a fluid for at least one of increasing, holding or decreasing heat transition or affecting heat transport and are optionally embedded in the porous, open-celled 3D-pattern material or are built of the porous, open-celled 3D-pattern material.

12. The building envelope according to claim 6, wherein the means for fluid supply and removal comprise:
fluid-permeable pipe sections, which are configured for passage of a fluid through a pipe wall for at least one of increasing, holding or decreasing heat transition or affecting heat transport.

13. The building envelope according to claim 6, comprising:
in the single intermediate space and/or in at least one of the at least two shells, means for heat exchange and heat collection to which are associated the means for fluid supply and removal, and to which are attached fluid conduits.

14. The building envelope according to claim 6, wherein the means for fluid supply and removal are connected to the space for joining between the first and second pipes associated with one another and/or are connected to a heat pipe formed by associated first and second pipe sections.

15. The building envelope according to claim 6, wherein the fluid for at least one of increasing, holding or decreasing heat transition or affecting heat transport is air, a mixture of gases or a liquid.

16. The building envelope according to claim 1, comprising a liquid pump in the first and/or second pipe, and/or wherein each end portion of a second pipe is arranged concentrically inside an associated end portion of a first pipe without contacting the associated end portion of a first pipe, or the converse.

17. The building envelope according to claim 1, comprising:
controllable sealing means configured for controlled sealing of the single intermediate space from both the interior and the exterior of the building and/or of a discrete building-envelope section of the building, wherein the controllable sealing means are configured to change their volumes and/or their shape under an effect of heat, electromagnetic radiation, chemicals or mechanical forces in a controlled manner.

18. The building envelope according to claim 1, comprising: means for fluid supply and removal for controlled supply and removal of a fluid for at least one of increasing, holding or decreasing heat transition through the building envelope or affecting heat transport into or out of the building envelope, and/or into or out of the single intermediate space and/or into or out of at least one of the at least two shells, wherein:
the single intermediate space and/or at least one of the at least two shells is divided into building-envelope sections, to which are separately attached controllable means for fluid supply and removal for section-selective management of a respective heat transition and where the building-envelope sections are separated from one another in fluid-tight manner and/or the separately controllable means for fluid supply and removal are configured for section-selective control of heat transport; and:
(i) sensor and/or input means for acquisition and/or inputting of section-specific values of a thermal state variable, including at least one of a measured or estimated outdoor temperature, sunlight intensity, a moisture content, or desired indoor temperature in each of respective building-envelope sections, are associated with the separate building-envelope sections which are connected on the input side with control means for the means for fluid supply and removal; and/or
(ii) the means for fluid supply and removal include gas or air pumps for generation of selected negative pressure, positive pressure, or normal pressure in the single intermediate space of each of the respective building-envelope section, and are configured to optionally include a gas or air reservoir; and/or
(iii) the means for fluid supply and removal are connected to first pipes on the exterior-facing shell and/or to second pipes on the interior-facing shell and/or to heat pipes formed by associated first and second pipes.

19. The building envelope according to claim 18, wherein the means for fluid supply and removal comprise:
liquid pumps and a liquid reservoir for filling of the single intermediate space of the respective building-envelope section with a fluid for at least one of increasing, holding or decreasing heat transition or affecting heat transport or the draining thereof.

20. The building envelope according to claim 18, comprising:
a conduit system in the single intermediate space and/or in at least one of the at least two shells configured to pass a fluid for at least one of increasing, holding or decreasing heat transition or affecting heat transport, which is sized to be section-specific and/or includes section-specific means of flow-control for flow control of the fluid for at least one of increasing, holding or decreasing heat transition or affecting heat transport.

21. The building envelope according to claim 20, wherein the means for fluid supply and removal comprise:
fluid-permeable conduit sections, which are configured for passage of fluid through a conduit wall for at least one of increasing, holding or decreasing heat transition or affecting heat transport.

22. The building envelope according to claim 18, wherein different walls, floor, or roof sections and/or walls, roofs or floors of spaces with different functions, which are associated with different cardinal directions, constitute building-envelope sections.

23. The building envelope according to claim 18, wherein the at least two shells are supported against one another by a plurality of individual spacers, configured to be washed around by a fluid for at least one of increasing, holding or decreasing heat transition or affecting heat transport and are optionally embedded in the porous, open-celled 3D-pattern material or are built of the porous, open-celled 3D-pattern material.

24. The building envelope according to claim 18, wherein the means for fluid supply and removal comprise:
fluid-permeable pipe sections, which are configured for passage of a fluid through a pipe wall for at least one of increasing, holding or decreasing heat transition or affecting heat transport.

25. The building envelope according to claim 18, comprising:
in the single intermediate space and/or in at least one of the at least two shells, means for heat exchange and heat collection to which are associated the means for fluid supply and removal, and to which are attached fluid conduits.

26. The building envelope according to claim 18, wherein the means for fluid supply and removal are connected to the space for joining between the first and second pipes associated with one another and/or are connected to a heat pipe formed by associated first and second pipes.

27. The building envelope according to claim 18, wherein the fluid for at least one of increasing, holding or decreasing heat transition or affecting heat transport is air, a mixture of gases or a liquid.

28. The building envelope according to claim 1, in combination with:
a structure having a fixed foundation.

29. The building envelope according to claim 1, in combination with:
a structure having a mobile foundation.

30. A process for control of indoor temperature in a building with a building envelope for a building wall, floor, or roof of the building, the building envelope comprising:
at least two shells spaced apart from one another which enclose a single intermediate space, the at least two shells including an exterior-facing shell configured to face an exterior of the building, and an interior-facing shell configured to face an interior of the building; and
a plurality of first pipes connected with the exterior-facing shell and including a heat-collector element on an exterior-facing side of the exterior-facing shell, the plurality of first pipes protruding through the exterior-facing shell and ending in the single intermediate space without contacting an exterior-facing side of the interior-facing shell,
the single intermediate space being sealed against the interior and the exterior of the building and being filled with structural weight-bearing and building-technology components, and at least in sections with porous, open-celled 3D-pattern material including at least one pore, wherein at least one of a shape and a size of the at least one pore is configured based on at least one of utilization and exposure of the building,
a plurality of second pipes arranged in the single intermediate space and connected with the interior-facing shell, without contacting the interior-facing side of the exterior-facing shell, the plurality of second pipes including a heat-collector element on an interior-facing side of the interior-facing shell, the plurality of second pipes protruding through the interior-facing shell and ending in the single intermediate space, in such a manner that each first pipe together with an associated second pipe form a heat pipe,
wherein each of the second pipes is arranged concentrically inside an associated first pipe without contacting the associated first pipe, or each of the first pipes is arranged concentrically inside an associated second pipe without contacting the associated second pipe,
wherein the process for control comprises:
controlling heat transition through a building-envelope and/or controlling heat transport into or out of the building envelope by fluid supply and removal for controlled supply and removal of a fluid into or out of the building envelope.

31. The process according to claim 30, comprising:
to increase the heat transition, introducing the fluid into an associated pipe and/or a liquid surface of a fluid formed as a liquid is set at a height of the pipes or above the pipes; and
to reduce the heat transition, draining the fluid from an associated pipe and/or a liquid surface of a fluid formed as a liquid is set at a height of the pipes or below the pipes; and/or
wherein the means for fluid supply and removal are operated under control, in response to acquired and/or input values of a thermal state variable on the building envelopes, including at least one of a measured or estimated outdoor temperature, sunlight intensity, a moisture content, or a desired preset indoor temperature.

\* \* \* \* \*